United States Patent [19]
Nakatani

[11] Patent Number: 6,018,376
[45] Date of Patent: Jan. 25, 2000

[54] SYNCHRONOUS REPRODUCTION APPARATUS

[75] Inventor: Shintarou Nakatani, Osakashi, Japan

[73] Assignee: Matsushita Electric Industrial Co., Ltd., Japan

[21] Appl. No.: 08/912,196

[22] Filed: Aug. 18, 1997

[30] Foreign Application Priority Data

Aug. 19, 1996 [JP] Japan .................................. 8-216510

[51] Int. Cl.[7] ...................................................... H04N 7/18

[52] U.S. Cl. ...................... 348/845.2; 348/515; 348/464; 348/423; 386/65; 386/110; 386/101

[58] Field of Search ............................... 348/845.1, 845.2, 348/461, 463, 464, 500, 423, 515; 386/65, 75, 101, 110

[56] References Cited

U.S. PATENT DOCUMENTS 5,481,307 1/1996 Goldstein et al. ...................... 348/390
5,596,420 1/1997 Daum ...................................... 348/515

Primary Examiner—Anand S. Rao
Attorney, Agent, or Firm—Parkhurst & Wendel, L.L.P.

[57] ABSTRACT

A synchronous reproduction apparatus for synchronously reproducing a video signal and an audio signal, receives a multiplexed bit stream in which the following data are packeted: video encoded data obtained by encoding video frames, each frame being a fundamental unit of reproduction of a video signal; video presentation time data showing a time to output a reproduced video signal of each video frame; audio encoded data obtained by encoding audio frames, each frame being a fundamental unit of reproduction of an audio signal; audio presentation time data showing a time to output a reproduced audio signal of each audio frame; and system time data.

6 Claims, 20 Drawing Sheets

Starting State

Normal State

Bit Stream Discontinuity Generating State

Reset State

Fig.4 (a)

Start-up Process

| Result of Comparison | Control Signal 121 |
|---|---|
| THmin(AS) ≦ audio presentation time error ≦ THmax(AS) | Present |
| audio presentation time error < THmin(AS) | Skip presentation |
| audio presentation time error > THmax(AS) | Wait for presentation |

Fig.4 (b)

Main Process

| Result of Comparison | Control Signal 121 |
|---|---|
| THmin(AM) ≦ audio presentation time error ≦ THmax(AM) | Present |
| audio presentation time error < THmin(AM) | Skip presentation |
| audio presentation time error > THmax(AM) | Wait for presentation |

Fig.5 (a)

Start-up Process

| Result of Comparison | Control Signal 119 |
|---|---|
| $TH_{min}(VS) \leq$ video presentation time error $\leq TH_{max}(VS)$ | Present |
| video presentation time error $< TH_{min}(VS)$ | Skip presentation |
| video presentation time error $> TH_{max}(VS)$ | Wait for presentation |

Fig.5 (b)

Main Process

| Result of Comparison | Control Signal 119 |
|---|---|
| $TH_{min}(VM) \leq$ video presentation time error $\leq TH_{max}(VM)$ | Present |
| video presentation time error $< TH_{min}(VM)$ | Skip presentation & present next one |
| video presentation time error $> TH_{max}(VM)$ | Wait for presentation & present previous one |

Fig.5 (c)

Seamless Process

| Result of Comparison | Control Signal 121 |
|---|---|
| Regardless of video presentation time error | Present |
| video presentation time error $< TH_{min}(VL)$ | Start audio signal decoding means |
| video presentation time error $> TH_{max}(VL)$ | |

Fig.5 (d)

Start-up Process 2

| Result of Comparison | Control Signal 119 |
|---|---|
| $TH_{min}(VS_2) \leq$ video presentation time error $\leq TH_{max}(VS_2)$ | Present |
| video presentation time error $< TH_{min}(VS_2)$ | Skip presentation & present next one |
| video presentation time error $> TH_{max}(VS_2)$ | Wait for presentation & present previous one |

Fig.6 (a)

| THmin(AS) | 0 |
|---|---|
| THmax(AS) | 0 |
| THmin(AM) | -4 |
| THmax(AM) | +4 |
| THmin(VS) | 0 |
| THmax(VS) | 0 |
| THmin(VM) | -5 |
| THmax(VM) | +5 |
| THmin(VL) | -15 |
| THmax(VL) | +15 |

Fig.6 (b)

| THmin(VS$_2$) | -2.5 |
|---|---|
| THmax(VS$_2$) | +2.5 |
| THmin(VM) | -9 |
| THmax(VM) | +9 |

SYNCHRONOUS REPRODUCTION APPARATUS

FIELD OF THE INVENTION

The present invention relates to a synchronous reproduction apparatus for synchronously reproducing a video signal and an audio signal end, more particularly, to a synchronous reproduction apparatus used for decoding reproduction of bit streams of digitally encoded video and audio signals.

BACKGROUND OF THE INVENTION

In a synchronous reproduction apparatus for synchronously reproducing a video signal and an audio signal, digitally encoded video and audio signals are given respective display time data and packeted, and information in which these signals and data are multiplexed is recorded in transmission media, such as storage media or communication media. The multiplexed bit stream recorded in such a transmission medium is transmitted to a decoder, wherein the bit stream is demultiplexed to a video signal and an audio signal and these signals are respectively decoded and reproduced. At the time of reproduction, it is indispensable to synchronize the video signal with the audio signal. For example, synchronization at lip sync level, which means coincidence of words of a person and motion of his/her mouth in a movie or the like, must be restricted within an error of about $1/10$ second.

In MPEG which is an international standard of compression coding of moving pictures, in order to make such a synchronization, an encoder is provided with a system clock serving as a time base and SCR (System Clock Reference) or PCR (Program Clock Reference) serving as a time reference of the system clock, and the system clock is set or corrected to a correct time with reference to the value of the SCR or PCR. Further, bit streams of digitally encoded video and audio signals are given data of PTS (Presentation Time Stamp) showing times for presentation of video frames and audio frames which are fundamental units of reproduction of a video signal and an audio signal, respectively, and these signals and data are packeted.

A decoder is provided with an internal clock serving as a time base, similar to the system clock of the encoder and, when the time shown by the internal clock coincides with a video presentation time and an audio presentation time respectively added to the video frame and the audio frame, the video frame and the audio frame are presented, whereby synchronous reproduction and output of the video signal and the audio signal are realized. The frequency of the internal clock of the decoder is counted up at 27 MHz equal to the frequency of the system clock. In addition, data of SCR or PCR serving as a time reference for setting or correcting the internal clock to a correct time is transmitted together with tile multiplexed bit stream of the video signal and the audio signal, from the encoder through a transmitting medium to the decoder.

FIG. 14(a) is a diagram for explaining the conception of synchronous reproduction of a video signal and an audio signal. In the figure, an intermediate stage shows an internal clock possessed by a decoder, and the time is counted up as proceeding toward the right side. An upper stage and a lower stage show a reproduced video signal and a reproduced audio signal, respectively, in which video frames and audio frames are successively presented along the time axis. Further, the presentation period of the video frame is 5, and the presentation period of the audio frame is 4. A number given to the head of each frame shows the presentation time corresponding to the frame.

As mentioned above, when the video signal and the audio signal have different presentation frequencies or when the system clock of the encoder and the internal clock of the decoder have different frequencies, synchronization error may occur between the reproduced video signal and the reproduced audio signal. Furthermore, depending on the system construction method employed for the decoder, coincidence with each frequency of the encoder is not made, resulting in synchronization error between the reproduced video signal and the reproduced audio signal.

FIG. 14(b) shows a case where the presentation frequency of the video signal is shifted in the decoder. In the figure, the frequency of the video signal in the decoder is $5/6$ of the frequency of the video signal in the encoder, and the presentation period of the video frame is changed from 5 to 6. As a result, the relative positions of the video frame and the audio frame are shifted, and a video frame 1301 whose video presentation time is 20 is delayed by time 4 compared with an audio frame whose video presentation time is 20, resulting in synchronization error between the reproduced video signal and the reproduced audio signal.

As mentioned above, in the decoder, since the video frame and the audio frame are presented when the video presentation time and the audio presentation time respectively possessed by the video frame and the audio frame coincide with the time of the internal clock, decoding and reproduction can be performed while maintaining synchronization between the video signal and the audio signal. To maintain synchronization between the reproduced video signal and the reproduced audio signal, the video presentation time and the audio presentation time possessed by the video frame and the audio frame are compared with the time of the internal clock, and differences of the video presentation time and the audio presentation time from the time of the internal clock are detected, followed by correction of the presentation timing.

When decoding and reproduction of the audio signal is carried out with the audio presentation time of each audio frame being adjusted to the time of the internal clock, some audio frames fail to be presented, resulting in discontinuity in the reproduced audio signal. This case will be described in detail using FIGS. 15(a)–15(c). FIG. 15(a) shows a case where the audio presentation time of each audio frame does not coincide with the time of the internal clock, and synchronization error occurs between the reproduced video signal and the reproduced audio signal. When the synchronization error is removed by adjusting the audio presentation time of each audio frame to the time of the internal clock, time discontinuity occurs in the successive audio frames and the audio signal is not reproduced smoothly, resulting in a degradation in tone quality. This degradation in tone quality is easily sensed by ears of human beings.

To avoid such a degradation in tone quality, an audio master system, in which an output of a reproduced audio signal is regarded as important, is applied to the conventional decoder, as disclosed in Japanese Published Patent Application No. Hei. 7-50818, for example. The audio master system will be described using FIG. 15(c). As shown in FIG. 15(c), in the audio master system, the time of the internal clock is updated using the audio presentation time of each audio frame, simultaneously with presentation of the audio frame. Hence, no time discontinuity occurs in the successive audio frames, and the audio signal is smoothly reproduced and output. At this time, the video presentation time of each video frame is compared with the time of the internal clock, and presentation of the video frame is advanced or delayed according to the result of the comparison.

FIGS. 16(a) to 16(d) are diagrams for explaining the operation for presenting video frames using the audio master system. FIG. 16(a) shows a state where the internal clock is updated using the audio presentation time of each audio frame, and the video presentation time does not coincide with the time of the internal clock. Initially, the time of the internal clock is subtracted from the video presentation time of the video frame to obtain a differential value, and this differential value is compared with a prescribed range. When the differential value is not within the range, presentation of the video frame is controlled, i.e., advanced or delayed. This range is an allowable range of synchronization error between the reproduced video signal and the reproduced audio signal, and it is set at −5 to +5, for example.

With reference to FIG. 16(a), at time 26 of the internal clock, a differential value of the video frame 1501 is −6, and this value is not within the allowable range of −5 to +5. The fact that the differential value is −6 means that the time for presentation of the video frame 1501 has passed already. In this case, as shown in FIG. 16(b), the video frame 1501 is not presented, and the next video frame 1502 is presented.

Further, in FIG. 16(c), at time 12, a differential value of the video frame 1503 is +6, and this value is not within the allowable range of −5 to +5. The fact that the differential value is +6 means than the time for presentation of the video frame 1503 has not reached yet. In this case, as shown in FIG. 16(d), the video frame 1504 is presented again.

As described above, in the decoder using the audio master system, synchronization error is removed by controlling only presentation of the video frame while maintaining temporal continuity of the audio frame, so that synchronization between the reproduced video signal and the reproduced audio signal is maintained without degrading the tone quality.

Hereinafter, a first problem to be solved by the present invention will be described using FIGS. 17(a) and 17(b). FIGS. 17(a) and 17(b) are diagrams for explaining a case where a start portion of data is input in the starting state of the decoder employing the audio master system. As shown in FIG. 17(a), the audio presentation time of the audio frame in the stating state is 0, and the video presentation time of the video frame in the starting state is 1. When the audio presentation time is earlier than the video presentation time, synchronous reproduction of the video signal and the audio signal is possible, so that no problem arises.

However, as shown in FIG. 17(b), when the audio presentation time (time 5) of the audio frame is later than the video presentation time (time 0) of the video frame in the starting state, since the count-up of the internal clock is started from the audio presentation time 5 of the initial audio frame 1601, presentation of the video frame 1602 at the video presentation time 0 is skipped, resulting in absence of head of the video signal.

Next, a second problem to be solved by the invention will be described using FIGS. 18(a) and 18(b). FIG. 18(a) shows a case where temporal discontinuity exists in the audio presentation time in the normal state where both the reproduced video signal and the reproduced audio signal are normally output in the decoder employing the audio master system. In FIG. 18(a), the presentation period of video frames is 5 and the presentation period of audio frames is 4, and a time jump occurs between the audio frame 1704 and the audio frame 1705. At this time, as shown in FIG. 18(b), since temporal continuity of the reproduced audio signal is regarded as important in the decoder employing the audio master system, the internal clock is updated using the audio presentation time 20 of the audio frame 1705 simultaneously with presentation of the audio frame 1705. So, though the video frame 1702 is intended as a frame to be presented next, since a differential value between the video presentation time 15 of the video frame 1702 and the time 23 of the internal clock is −8, that is, not within the allowable range of −5 to +5, presentation of the video frame 1702 is skipped and the next video frame 1703 is presented. However, this video frame 1703 is not in the accurately synchronized state.

As described above, discontinuity in the audio presentation time causes omission of a video frame, so that smooth presentation of video frames is not possible. In addition, a video frame next to the omitted video frame is not reproduced in the accurately synchronized state.

Next, a third problem to be solved by the invention will be described using FIGS. 19(a)–19(c). FIG. 19(a) shows a case where temporal discontinuity occurs in input data of a multiplexed bit stream due to track jumping or the like in the normal state where both the reproduced video signal and the reproduced audio signal are normally output in the decoder employing the audio master system. In FIG. 19(a), the presentation period of the video frame is 5 and the presentation period of the audio frame is 4, and time jump occurs between the video frame 1801 and the video frame 1802 and between the audio frame 1804 and the audio frame 1805. At this time, as shown in FIG. 19(b), when the video frames are presented with attaching importance to continuity of the reproduced video signal without applying the audio master system to the decoder, the same effect as scene change is obtained, and no problem arises.

However, as shown in FIG. 19(c), in the decoder employing the audio master system, when the video frame 1802 is presented, since the internal clock is updated by the presentation time 24 of the audio frame 1805, a differential value between the video presentation time 20 of the video frame 1802 and the time 10 of the internal clock is +10, and this value exceeds the allowable range, so that presentation of the video frame 1801 is performed again. Though the video frame 1802 is intended as a frame to be presented next, since a differential value between the video presentation time 20 of the video frame 1802 and the time 27 of the internal clock is −7, that is, below the allowable range, presentation of the video frame 1802 is skipped and the next video frame 1803 is presented. However, this video frame 1803 is not in the accurately synchronized state.

As described above, in the decoder employing the audio master system, when time discontinuity occurs in the multiplexed bit stream due to track jumping or the like during the normal operation, smooth presentation of video frames cannot be performed because of the skipped video frame and, furthermore, a video frame next to the skipped video frame cannot be reproduced in the accurately synchronized state.

SUMMARY OF THE INVENTION

An object of the present invention is to provide a synchronous reproduction apparatus capable of synchronous reproduction of a video signal and an audio signal by performing adaptive presentation of video frames and audio frames in any case where temporal discontinuity occurs in the video presentation time or the audio presentation time during the starting operation or the normal operation.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a synchronous reproduction apparatus for synchronously reproducing a video signal and an audio signal, and receiving a multiplexed bit stream in which the following data are packeted: video encoded data obtained by encoding video frames, each frame being a fundamental unit of reproduction of a video signal; video presentation time data showing a time to output a reproduced video signal of each video frame; audio encoded data obtained by encoding audio frames, each frame being a fundamental unit of reproduction of ail audio signal; audio presentation time data showing a time to output a reproduced audio signal of each audio frame; and system time data: and the apparatus comprises system demultiplexing means for demultiplexing the multiplexed bit stream into the video encoded data, the audio encoded data, the video presentation time data, the audio presentation time data, and the system time data; video signal decoding means for decoding the video encoded data to produce a reproduced video signal; audio signal decoding means for decoding the audio encoded data to produce a reproduced audio signal; selecting means for selecting the system time separated from the multiplexed bit stream by the system demultiplexing means, during the starting operation wherein output of the reproduced video signal and the reproduced audio signal is started, while selecting the audio presentation time separated from the multiplexed bit stream by the system demultiplexing means, during the normal operation after the starting operation, wherein the reproduced video signal and the reproduced audio signal are successively output; an internal clock for setting its time with reference to the system time output from the selecting means during the starting operation and setting its time with reference to the audio presentation time output from the selecting means during the normal operation, and generating successive reference times; video presentation time comparing means for providing a difference between the video presentation time and the time of the internal clock, and outputting the difference as a video presentation time error during the starting operation and the normal operation; audio presentation time comparing means for providing a difference between the audio presentation time and the time of the internal clock, and outputting the difference as an audio presentation time error during the starting operation and the normal operation; video control means for controlling, during the starting operation, the video signal decoding means so that output of the reproduced video signal is started when the video presentation time error is within a prescribed range $TH_{min}(VS) \sim TH_{max}(VS)$ and, during the normal operation, controlling the video signal decoding means by advancing or delaying output of the reproduced video signal so that the video presentation time error is within a prescribed range $TH_{min}(VM) \sim TH_{max}(VM)$; and audio control means for controlling, during the starting operation, the audio signal decoding means so that output of the reproduced audio signal is started when the audio presentation time error is within a prescribed range $TH_{min}(AS) \sim TH_{max}(AS)$ and, during the normal operation, controlling the audio signal decoding means by advancing or delaying output of the reproduced audio signal so that the video presentation time error is within a prescribed range $TH_{min}(AM) \sim TH_{max}(AM)$.

According to a second aspect of the present invention, in the above-mentioned synchronous reproduction apparatus, during the starting operation, the video control means controls the video signal decoding means so that output of the reproduced video signal is started when the video presentation time error is within the range $TH_{min}(VS) \sim TH_{max}(VS)$ and, during the normal operation, the video control means monitors whether the video presentation time error is within the range $TH_{min}(VM) \sim TH_{max}(VM)$ or not and, when the error is not within the range, the video control means controls the video signal decoding means by advancing or delaying output of the reproduced video signal so that the error is within the range $TH_{min}(VS) \sim TH_{max}(VS)$; and during the starting operation, the audio control means controls the audio signal decoding means so that output of the reproduced audio signal is started when the audio presentation time error is within the range $TH_{min}(AS) \sim TH_{max}(AS)$ and, during the normal operation, the audio control means monitors whether the video presentation time error is within the range $TH_{min}(AM) \sim TH_{max}(AM)$ or not and, when the error is not within the range, the audio control means controls the audio signal decoding means by advancing or delaying output of the reproduced audio signal so that the error is within the range $TH_{min}(AM) \sim TH_{max}(AS)$.

According to a third aspect of the present invention, in the above-mentioned synchronous reproduction apparatus, the selecting means selects the video presentation time separated from the multiplexed bit stream by the system demultiplexing means, when time discontinuity occurs in the multiplexed bit stream in the normal state, until recovering to the normal state; when discontinuity occurs in the multiplexed bit stream, the internal clock sets its time with reference to the video presentation time output from the selecting means, and generates successive reference times; when discontinuity occurs in the multiplexed bit stream, the video presentation time comparing means provides a difference between the video presentation time and the time of the internal clock, and outputs the difference as a video presentation time error; when discontinuity occurs in the multiplexed bit stream, the audio presentation time comparing means provides a difference between the audio presentation time and the time of the internal clock, and outputs the difference as an audio presentation time error; when discontinuity occurs in the multiplexed bit stream, the video control means controls the video signal decoding means so that the reproduced video signal is output without omission, regardless of the value of the video presentation time error and, when the video presentation time error exceeds a prescribed range $TH_{min}(VL) \sim TH_{max}(VL)$, the video control means starts the audio signal decoding means so that output of the reproduced audio signal is started and, at the start of the output of the reproduced audio signal, the video control means returns to the control mode in the normal operation; and when discontinuity occurs in the multiplexed bit stream, the audio control means resets the audio signal decoding means to stop output of the reproduced audio signal and, after the video control means starts the audio signal decoding means, the audio control means controls the audio decoding means so that output of the reproduced audio signal is started when the audio presentation time error is within the range $TH_{min}(AS) \sim TH_{max}(AS)$, and at the start of the output of the reproduced audio signal, the audio control means returns to the control mode in the normal operation.

According to a fourth aspect of the present invention, in the above-mentioned synchronous reproduction apparatus, the video signal decoding means decodes the video encoded data to provide the reproduced video signal, and outputs the video presentation time; and the audio signal decoding means decodes the audio encoded data to provide the reproduced audio signal, and outputs the video presentation time.

According to a fifth aspect of the present invention, the above-mentioned synchronous reproduction apparatus further comprises an external interface for posting information of request-to-start, information of request-to-reset, and information of time discontinuity in the multiplexed bit stream, from the outside, to the selecting means, the video control means, and the audio control means.

According to a sixth aspect of the present invention, the above-mentioned synchronous reproduction apparatus further comprises an external interface for posting information of request-to-start and information of request-to-reset, from the outside, to the selecting means, the video control means, and the audio control means; and bit stream discontinuity detecting means for detecting time discontinuity in the multiplexed bit stream and posting the information to the selecting means, the video control means, and the audio control means.

BRIEF DESCRIPTION OF THE DRAWINGS

FIGS. 4(a) and 4(b) are diagrams for explaining processing contents when the processing mode of the audio control means of the synchronous reproduction apparatus according to the first embodiment is the start-up process (4(a)) and the main process (4(b)).

FIGS. 5(a)–5(d) are diagrams for explaining processing contents when the processing mode of the video control means of the synchronous reproduction apparatus according to the first embodiment is the start-up process (5(a)), the main process (5(b)), the seamless process (5(c)) and start-up process.

FIGS. 6(a) and 6(b) are diagrams illustrating set values of allowable error ranges of the synchronous reproduction apparatus according to the first embodiment.

DETAILED DESCRIPTION OF THE PREFERRED EMBODIMENTS

[Embodiment 1]

Hereinafter, a synchronous reproduction apparatus according to a first embodiment of the invention will be described with reference to the figures.

Figure 1:
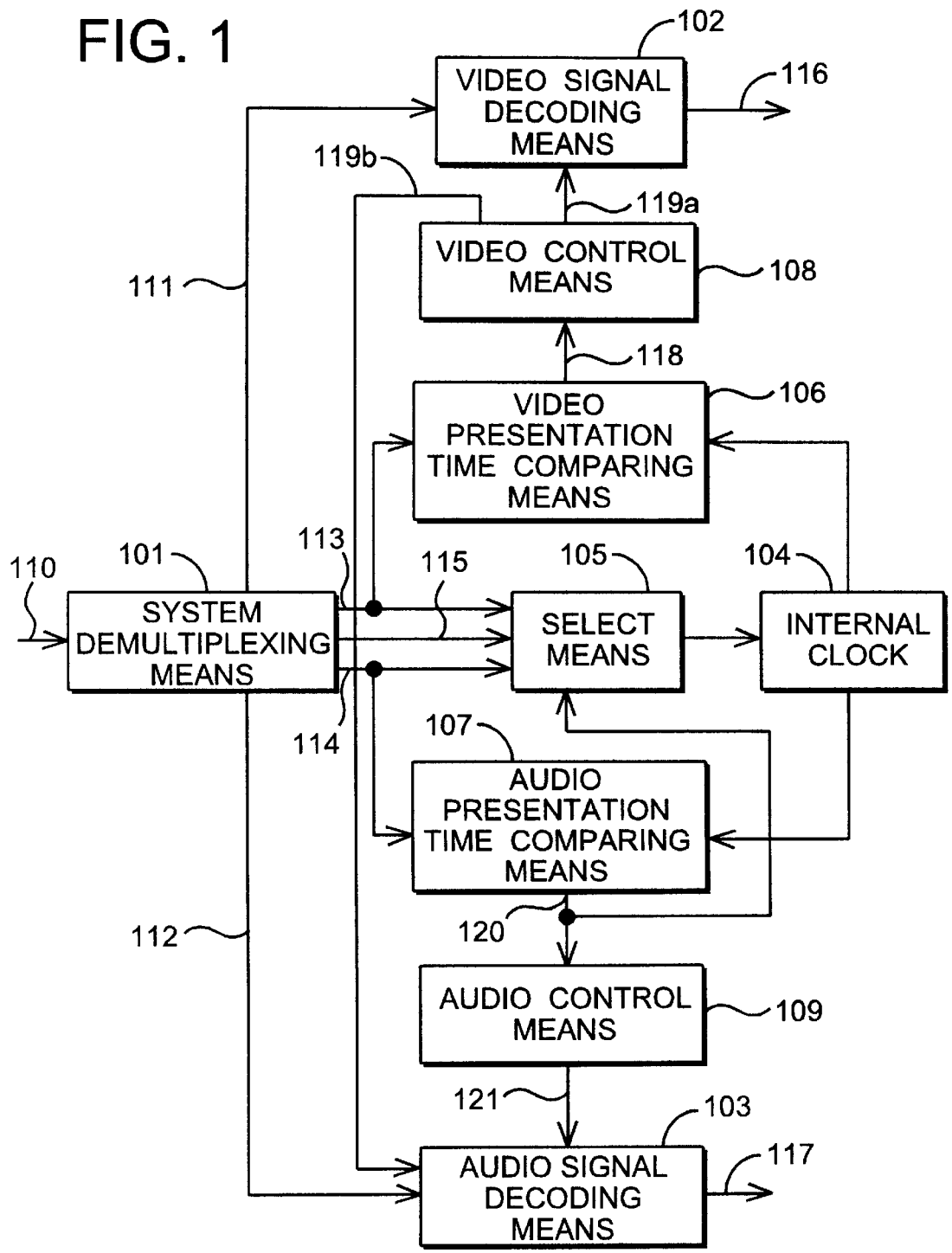
FIG. 1 is a block diagram illustrating a synchronous reproduction apparatus according to a first embodiment of the invention.

FIG. 1 is a block diagram illustrating the structure of the synchronous reproduction apparatus according to the first embodiment.

As shown in FIG. 1, the synchronous reproduction apparatus receives a multiplexed bit stream 110 in which the following data are packeted: a video bit stream obtained by encoding video frames, each frame being a fundamental unit of reproduction of a video signal; video presentation time data showing a time to output a reproduced video signal of each video frame; an audio bit stream obtained by encoding audio frames, each frame being a fundamental unit of reproduction of an audio signal; audio presentation time data showing a time to output a reproduced audio signal of each audio frame; and system time data.

In FIG. 1, a system demultiplexing means 101 receives the multiplexed bit stream 110, demultiplexes the multiplexed bit stream 110 to the video bit stream 111, the audio bit stream 112, the video presentation time data 113, the audio presentation time data 114, and the system time data 115, and outputs these data.

A video signal decoding means 102 performs decoding of the video bit stream 111 separated from the multiplexed bit stream 110 by the system demultiplexing means 101, and outputs a reproduced video signal 116 of a video frame to be presented according to a control signal 119a from a video control means 108. In addition, the video signal decoding means 102 stops decoding of the video bit stream 111 and returns to its initial state according to reset control by the video control means 108, and starts decoding of the video bit stream 111 according to start control by the video control means 108.

An audio signal decoding means 103 performs decoding of the audio bit stream 112 separated from the multiplexed bit stream 110 by the system demultiplexing means 101, and outputs a reproduced audio signal 117 of an audio frame to be presented according to a control signal 121 from an audio control means 109. In addition, the audio signal decoding means 103 stops decoding of the audio bit stream 112 and returns to its initial state according to reset control by the audio control means 109, and starts decoding of the audio bit stream 112 according to start control by the audio control means 109.

An internal clock 104 performs count-up at prescribed periods, sets its own time with reference to one of a system time 115, a video presentation time 113, and an audio presentation time 114, which is selected by a selecting means 105, and generates a successive base time.

The selecting means 105 adaptively selects one of the system time 115, video presentation time 113, and audio presentation time 114 which have been separated from the multiplexed bit stream 110 by the system demultiplexing means 101, according to any of four states mentioned later in which the synchronous reproduction apparatus operates as the whole system and, thereafter, the selecting means 105 updates the internal clock 104 using the selected time.

A video presentation time comparing means 106 provides a differential value by subtracting the time of the internal clock 104 from the video presentation time 113 which has been separated from the multiplexed bit stream 110 by the system demultiplexing means 101, and outputs the differential value as a video presentation time error 118.

An audio presentation time comparing means 107 provides a differential value by subtracting the time of the internal clock 104 from the audio presentation time 114 which has been separated from the multiplexed bit stream 110 by the system demultiplexing means 101, and outputs the differential value as an audio presentation time error 120.

A video control means 108 compares the video presentation time error 118 with a prescribed allowable error range described later, and outputs a signal 119a for controlling the video signal decoding means 102 according to the result of the comparison. Further, the video control means 108 performs reset control and start control of the video signal decoding means 102, and start control of the audio signal decoding means 103 as well.

An audio control means 109 compares the audio presentation time error 120 with a prescribed allowable error range described later, and outputs a signal 121 for controlling the audio signal decoding means 103 according to the result of the comparison. Further, the audio control means 109 performs reset control and start control of the audio signal decoding means 103.

Next, a description is given of the operating state of the synchronous reproduction apparatus according to this first embodiment as the whole system.

Figure 2:
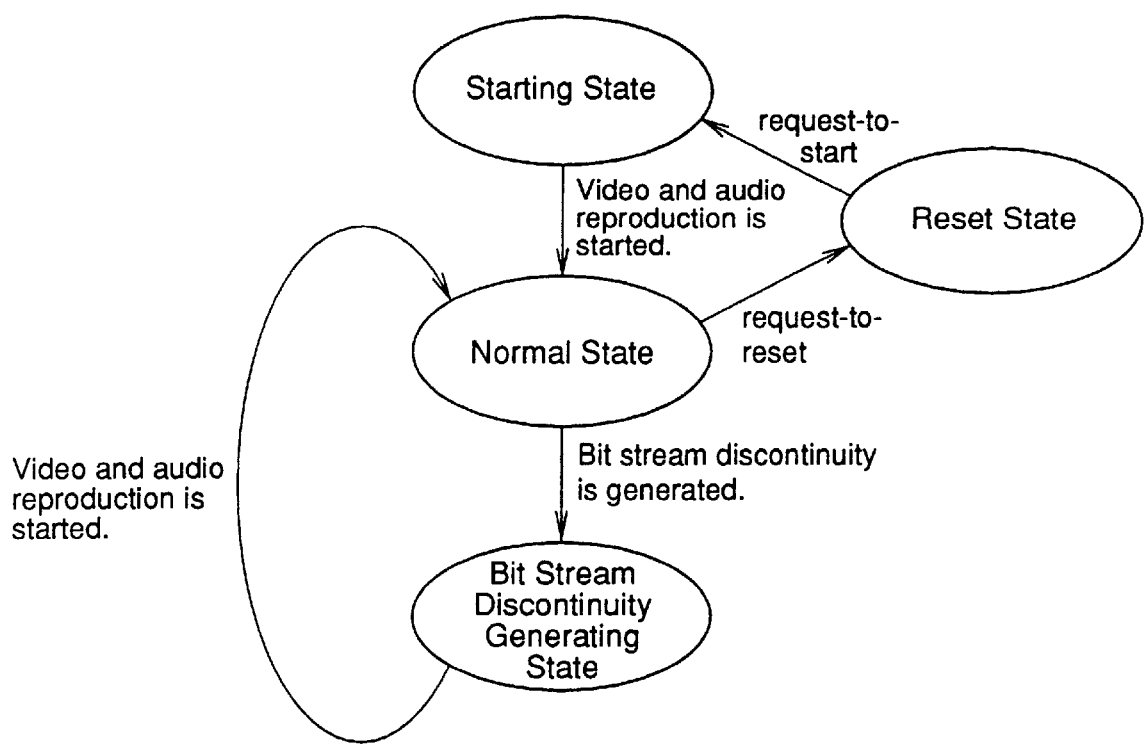
FIG. 2 is a diagram illustrating state-to-state transition when the synchronous reproduction apparatus according to the first embodiment operates as the whole system.

FIG. 2 is a diagram for explaining transition of four states in which the synchronous reproduction apparatus operates as the whole system. In the starting state, decoding of the video bit stream 111 and the audio bit stream 112 is started. The system retains in this starting state until output of both the reproduced video signal 116 and the reproduced audio signal 117 is started. When output of these signals 116 and 117 is started, the system changes from the starting state to the normal state.

In the normal state, both the reproduced video signal 116 and the reproduced audio signal 117 are output normally. More specifically, "normal output" means that the reproduced video signal 116 is synchronized with the reproduced audio signal 117, and the video frames and the audio frames are successively output. If temporal discontinuity occurs in the multiplexed bit stream 110 during the normal operation, the system changes from the normal state to the bit stream discontinuity generating state.

In the bit stream discontinuity generating state, a return process for recovering synchronization of the video signal and the audio signal is performed. When synchronization of the video signal and the audio signal is recovered and both the reproduced video signal 116 and the reproduced audio signal 117 are normally output, the system returns from the bit stream discontinuity generating state to the normal state.

In the reset state, decoding of both the video bit stream 111 and the audio bit stream 112 is stopped and the system returns to the initial state. When request-to-reset is generated in the normal state, the system changes from the normal state to the reset state. When the next request-to-start is output, the system changes from the reset state to the starting state.

A description is now given of processing contents of the video control means, the audio control means, and the selecting means, corresponding to the respective states of the system mentioned above, with reference to FIGS. 3(a)–3(d).

Figure 3:
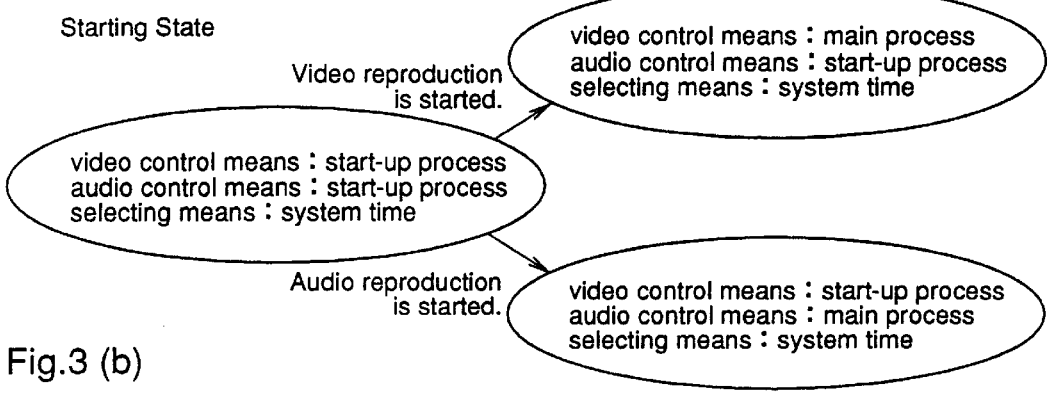
FIGS. 3(a)–3(d) are diagrams for explaining processing contents of video control means, audio control means, and selecting means included in the synchronous reproduction apparatus according to the first embodiment, in the starting state (3(a)), the normal state (3(b)), the state where discontinuity occurs in a multiplexed bit stream in the normal state (3(c)), and the reset state (3(d)).
Figure 3:
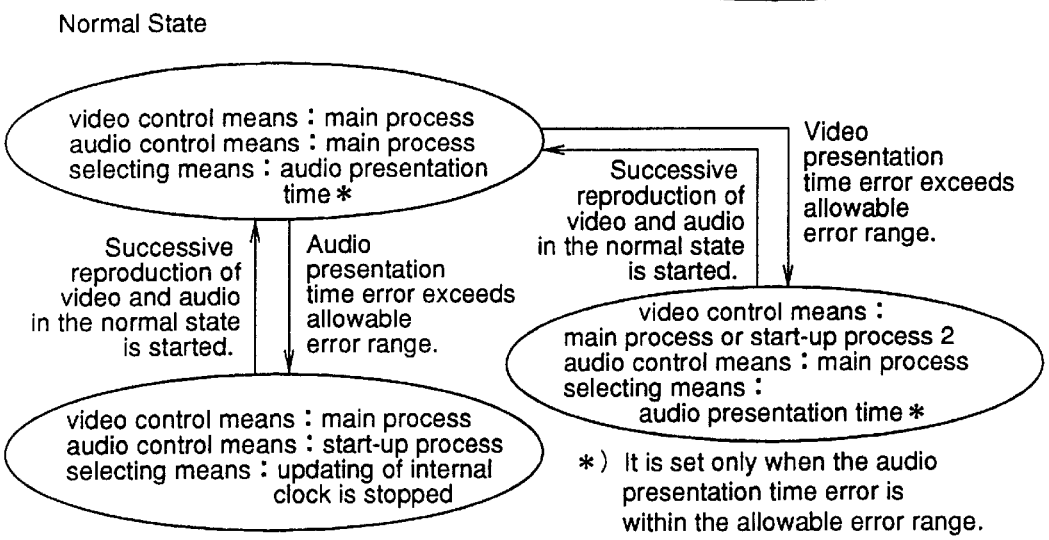
Figure 3:
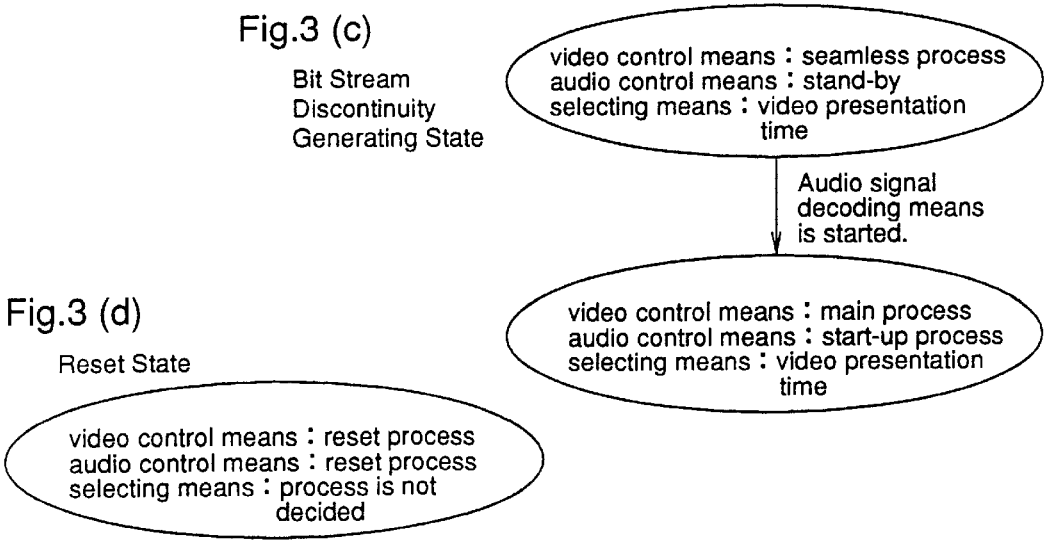
Figure 3:
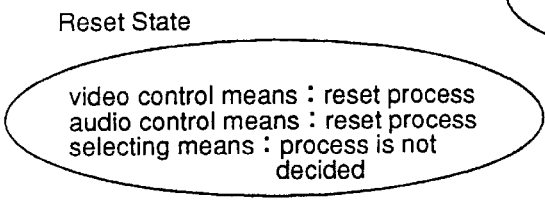

Initially, with reference to FIGS. 3(a)–3(d), four processing modes adaptively used by the video control means and the audio control means according to the respective states of the system will be described. FIG. 3(a) is a diagram for explaining the processing modes of the video control means 106, the audio control means 109, and the selecting means 105 in the starting state. In the starting state, both the video control means 108 and the audio control means 109 perform the start-up process. When output of the reproduced video signal 116 is started, the processing mode of the video control means 108 changes to the main process. When output of the reproduced audio signal 117 is started, the processing mode of the audio control means 109 changes to the main process.

FIG. 3(b) is a diagram for explaining the processing modes of the video control means 108, the audio control means 109, and the selecting means 105 in the normal state. In the normal slate, the video control means 108 and the audio control means 109 basically perform the main process. When the audio presentation time error 120 is not within a prescribed allowable error range $TH_{min}(AM) \sim TH_{max}(AM)$, until output of the next reproduced audio signal 117 is started, the processing mode of the audio control means 109 temporarily changes to the start-up process. When the system recovers to the normal state wherein the reproduced video signal 116 and the reproduced audio signal 117 are synchronized with each other and the video frames and the audio frames are successively output, the processing mode of the audio control means 109 returns to the main process.

When the video presentation time error 118 is not within a prescribed allowable error range $TH_{min}(VM)\sim TH_{max}(VM)$, the processing mode of the video control means 108 temporarily changes to the start-up process 2 until output of the next reproduced video signal 116 is started. However, there is a case where the processing mode of the video control means 108 does not changes to the start-up process 2 but remains in the main process. When the system recovers to the normal state wherein the reproduced video signal 116 and the reproduced audio signal 117 are synchronized with each other and the video frames and the audio frames are successively output, the processing mode of the video control means 108 returns to the main process.

FIG. 3(c) is a diagram for explaining the processing modes of the video control means 108, the audio control moans 109, and the selecting means 105 when temporal discontinuity occurs in the multiplexed bit stream in the normal state. In the bit stream discontinuity generating state, the video control means 108 performs the seamless process and the audio control means 109 stands by. When the audio signal decoding means 103 is started, the processing mode of the video control means 108 changes to the main process, and the processing mode of the audio control means 109 changes to the start-up process. Although it is not shown in FIG. 3(c), when the system recovers to the normal state wherein the reproduced video signal 116 and the reproduced audio signal 117 are synchronized with each other and the video frames and the audio frames are successively output, the processing mode of the audio control means 109 returns to the main process.

FIG. 3(d) is a diagram for explaining the processing modes of the video control means 108, the audio control means 109, and the selecting means 105 in the reset state. In the reset state, both the video control means 108 and the audio control means 109 perform the reset process.

Next, a description is given of time data selected by the selecting means 105 according to the respective states of the system, with reference to FIGS. 3(a)–3(d). The selecting means 105 adaptively selects one of the system time, the video presentation time, and the audio presentation time, corresponding to any of the four states of the system of the synchronous reproduction apparatus. Then, the selecting means 105 updates the internal clock 104 using the time. However, when the audio presentation time 114 is selected, the audio presentation time comparing means 107 provides a differential value between the audio presentation time 114 and the time of the internal clock 104 and, only when the audio presentation time error 120 as a result of the calculation is within a prescribed allowable error range, the selecting means 105 updates the internal clock 104.

The selecting means 105 in the starting state selects the system time 115 as shown in FIG. 3(a).

The selecting means 105 in the normal state basically selects the audio presentation time 114 as shown in FIG. 3(b). However, when the audio presentation time error 120 is not within the prescribed allowable error range $TH_{min}(AM)\sim TH_{max}(AM)$, the internal clock 104 is not updated. In addition, while the processing mode of the audio control means 109 changes from the start-up process to the main process, update of the internal clock 104 is halted.

When discontinuity occurs in the bit stream in the normal state, the selecting means 105 selects the video presentation time 113 as shown in FIG. 3(c).

In the reset state, as shown in FIG. 3(d), the selecting means 105 updates, or does not update, the internal clock 104.

Hereinafter, the operating modes of the video control means 108, the audio control means 109, and the selecting means 105 will be described in more detail.

First of all, the operation of the video control means 108 will be described using FIGS. 4(a) and 4(b). FIG. 4(a) shows the processing contents when the processing mode of the audio control means 108 is the start-up process. On the basis of the result of comparison between the audio presentation time error 120 and the prescribed allowable error range $TH_{min}(AS)\sim TH_{max}(AS)$, the audio control means 109 outputs a control signal 121 shown in FIG. 4(a) to the audio signal decoding means 103.

As the result of the comparison, when the audio presentation time error 120 is within the range $TH_{min}(AS)\sim TH_{max}(AS)$, the audio control means 109 outputs a control signal 121 which gives an instruction to "present" the audio frame to the audio signal decoding means 103. When the audio presentation time error 120 is below the lower limit $TH_{min}(AS)$ of the allowable error range, the audio control means 109 decides that the time for presentation of the audio frame has passed already, and outputs a control signal 121 that gives an instruction to "skip presentation" of the audio frame to the audio signal decoding means 103. When the audio presentation time error 120 exceeds the upper limit $TH_{max}(AS)$ of the allowable error range, the audio control means 109 decides that the time for presentation of the audio frame has not been reached yet, and outputs a control signal 121 that gives an instruction to "wait for presentation" of the audio frame to the audio signal decoding means 103.

When the processing mode of the audio control means 109 is the main process, the processing contents are as shown in FIG. 4(b). On the basis-of the result of comparison between the audio presentation time error 120 and the prescribed allowable error range $TH_{min}(AM)\sim TH_{max}(AM)$, the audio control means 109 outputs a control signal 121 to the audio signal decoding means 103. The contents of the main process are identical to those of the above-mentioned start-up process (refer to FIG. 4(a)) except that different values are employed for the allowable error range $TH_{min}(AM)\sim TH_{max}(AM)$ (refer to FIGS. 6(a) and 6(b)). The reason is as follows. Since the start-up process is performed when the reproduction start timing is adjusted mainly in the starting operation, a relatively high comparison accuracy is required. In contrast to the start-up process, since the main process is performed when discontinuity in the audio presentation time is detected mainly in the normal operation, a high comparison accuracy is not required. In the main process, if the allowable error range is too narrow, unnecessary corrections are carried out. So, to give a little margin is rather effective than to narrow the range. Therefore, the allowable error ranges of the start-up process and the main process have the following relationships.

$$TH_{max}(AS) \leq TH_{max}(AM)$$

$$TH_{min}(AS) \geq TH_{min}(AM)$$

$$TH_{max}(VS) \leq TH_{max}(VM)$$

$$TH_{min}(VS) \geq TH_{min}(VM)$$

When the processing mode of the video control means 108 is the start-up process, the contents of the process are as shown in FIG. 5(a). On the basis of the result of comparison between the video presentation time error 118 and the prescribed allowable error range $TH_{min}(VS)\sim TH_{max}(VS)$, the video control means 108 outputs a control signal 119a to the video signal decoding means 102. The contents of this process are identical to those in the case where the processing mode of the audio control means 109 is the start-up process (refer to FIG. 4(a)) except that the allowable error range $TH_{min}(VS)$~$TH_{max}(VS)$ employs different values from those for the audio control means 109 (refer to FIGS. 6(a) and 6(b)).

FIG. 5(b) shows processing contents when the processing mode of the video control means 108 is the main process. On the basis of the result of comparison between the video presentation time error 118 and the prescribed allowable error range $TH_{min}(VM)$~$TH_{max}(VM)$, the video control means 108 outputs a control signal 119a to the video signal decoding means 102.

As the result of the comparison, when the video presentation time error 118 is within the range $TH_{min}(VM)$~$TH_{max}(VM)$, the video control means 108 output a control signal 119a that gives an instruction to "present" the video frame Lo the video signal decoding means 102. When the video presentation time error 118 is below the lower limit $TH_{min}(VS)$ of the allowable error range, the video control means 108 decides that the time for presentation of the video frame has passed already, and outputs a control signal 119a that gives an instruction to "skip presentation" of the video frame and an instruction to "present" the next video frame, at the same time, to the video signal decoding means 102. When the video presentation time error 118 exceeds the upper limit $TH_{max}(VM)$ of the allowable error range, the video control means 108 decodes that the time for presentation of the video frame has not been reached yet, and outputs a control signal 119a that gives an instruction to "wait for presentation" of the video frame and an instruction to "present" the previous video frame, at the same time, to the video signal decoding means 102.

FIG. 5(c) shows the processing contents when the processing mode of the video control means 108 is the seamless process. On the basis of the result of comparison between the video presentation time error 118 and the prescribed allowable error range $TH_{min}(VL)$~$TH_{max}(VL)$, the video control means 108 outputs a control signal 119a to the video signal decoding means 102. The content of this process is to give an instruction to "present" the video frame regardless of the result of the comparison. Further, the video control means 108 outputs a control signal 119b to the audio signal decoding means 103. The content of this process is to control start of the audio signal decoding means 103 only when the video presentation time error 118 is not within the allowable error range $TH_{min}(VL)$~$TH_{max}(VL)$.

FIG. 5(d) shows the processing contents when the processing mode of the video control means 108 is the start-up process 2. On the basis of the result of comparison between the video presentation time error 118 and a prescribed allowable error range $TH_{min}(VS_2)$~$TH_{max}(VS_2)$, the video control means 108 outputs a control signal 119a to the video signal decoding means 102. The contents of this process are identical to those of the video control means 108 when its processing mode is the start-up process (refer to FIG. 5(a)) except that the allowable error range $TH_{min}(VS_2)$~$TH_{max}(VS_2)$ employs different values from those employed for the start-up process (refer to FIGS. 6(a) and 6(b)).

Although the processing content when the processing mode of the video control means 108 is the reset process is not shown, it is to send a reset signal to the video signal decoding means 102.

Although the processing content when the processing mode of the audio control means 109 is the reset process is not shown, it is to send a reset signal to the audio signal decoding means 103.

Hereinafter, a description is given of the operation of the synchronous reproduction apparatus so constructed, corresponding to each of the above-mentioned four states of the system. In the following description, the presentation period of the video frame is 5, and the presentation period of the audio frame is 4. In addition, for the allowable error ranges to be compared with the video presentation time error 118 and the audio presentation time error 120, the set values shown in FIGS. 6(a) and 6(b) are employed, respectively.

Figure 7:
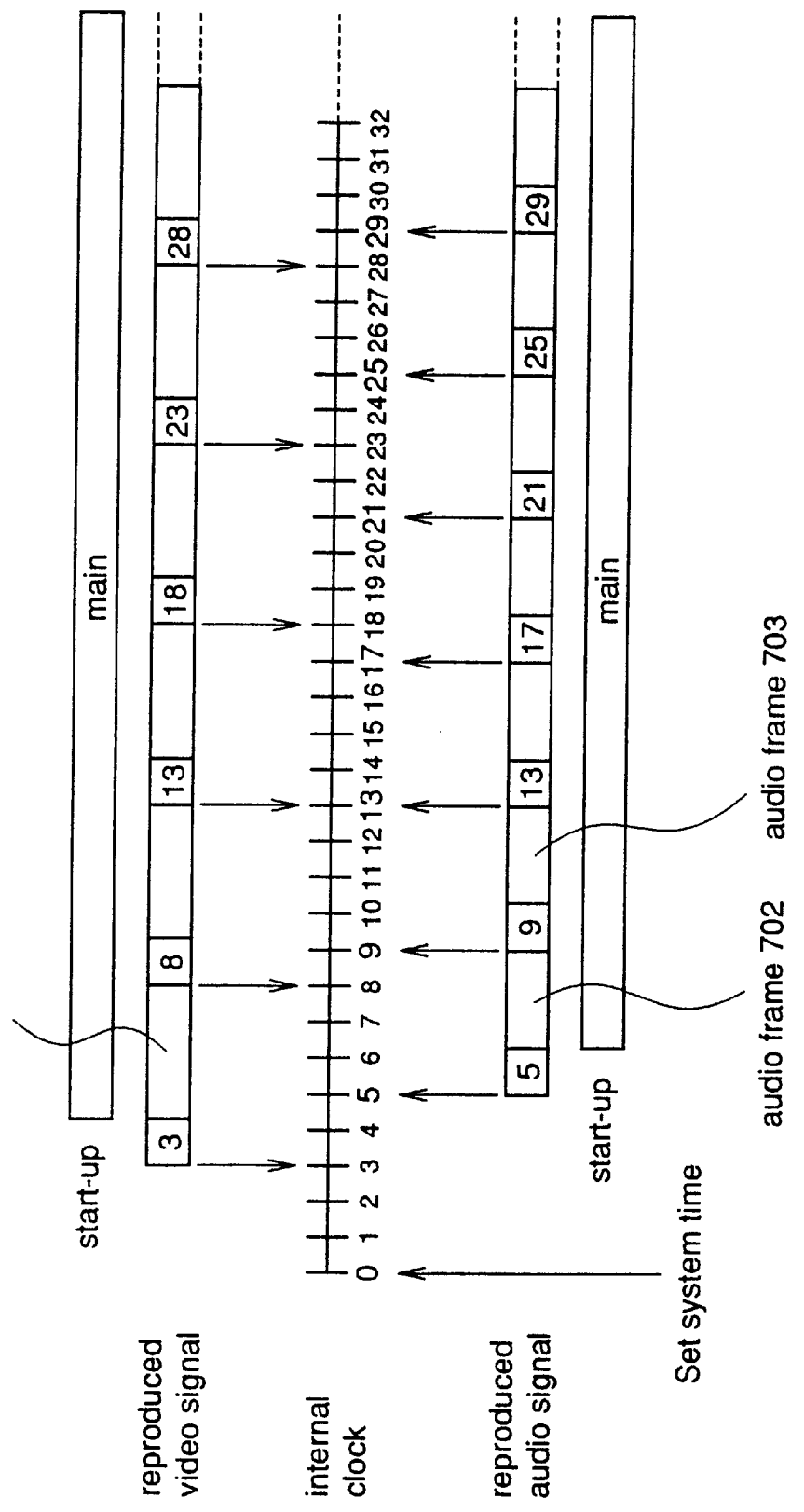
FIG. 7 is a diagram for explaining the operation of the synchronous reproduction apparatus according to the first embodiment in the starting state.

Initially, the operation of the synchronous reproduction apparatus in the starting state will be described using FIG. 7 FIG. 7 shows, in descending order, the processing mode of the video control means 108, the reproduced video signal 116 output from the video decoding means 102, the time of the internal clock 104, the reproduced audio signal 117 output from the audio decoding means 103, and the processing mode of the audio control means 109. In the starting state, as shown in FIG. 3(a), both the video control means 108 and the audio control means 109 perform the start-up process, and the selecting means 105 selects the system time 115.

As shown in FIG. 7, initially, the time of the internal clock 104 is set to 0 by the system time 115 selected by the selecting means 105. At time 0, the video presentation time error of the video frame 701 is 3, and the audio presentation time error of the audio frame 702 is 5. Since these errors exceed the upper limits of the respective allowable error ranges as shown in FIGS. 4(a), 5(a), and 6(a), both the video frame 701 and the audio frame 702 are kept waiting for presentation. This process is the same at time 1 and time 2.

At time 3, the video presentation time error 118 of the video frame 701 becomes 0. Since, this error is within the allowable error range $TH_{min}(VS)$~$TH_{max}(VS)$, output of the reproduced video signal 116 of the video frame 702 is started, and the processing mode of the video control means 108 changes to the main process.

At time 5, the audio presentation time error 120 of the audio frame 702 becomes 0. Since this error is within the allowable error range $TH_{min}(AS)$~$TH_{max}(AS)$, output of the reproduced audio signal 117 of the audio frame 702 is started. At time 5, both the reproduced video signal 116 and the reproduced audio signal 117 are output, and the state of the system changes from the starting state to the normal state, as shown in FIG. 2. In the normal state, as shown in FIG. 3(b), both the video control means 108 and the audio control means 109 perform the main process, and the selecting means 105 selects the audio presentation time 114. Hence, the time of the internal clock 104 is updated using the audio presentation time of each audio frame after the audio frame 703.

Since the synchronous reproduction apparatus according to the first embodiment performs as mentioned above, in the starting operation, it is possible to start synchronous reproduction of the video signal and the audio signal without missing the head of the video signal.

Next, the operation of the synchronous reproduction apparatus in its normal state will be described using FIGS. 8(a) and 8(b), and 16(a)–16(d).

In the normal state, as shown in FIG. 3(b), both the video control means 108 and the audio control means 109 perform the main process, and the selecting means 105 selects the audio presentation time 114.

First of all, a description is given of the operation of the synchronous reproduction apparatus in a case where synchronization error occurs between the reproduced video signal and the reproduced audio signal in the normal state, using FIGS. 16(a)–16(d).

Figure 16:
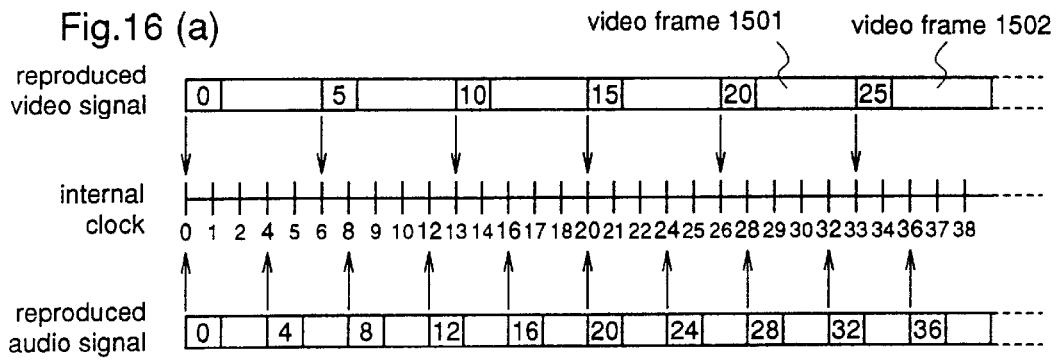
FIG. 16(a) is a diagram for explaining the operation of the conventional synchronous reproduction apparatus employing the audio master system in the case where synchronization error occurs in the reproduced video signal.
FIGS. 16(b)–16(d) are diagrams for explaining the operation to remove the synchronization error by controlling the reproduced video signal.
Figure 16:
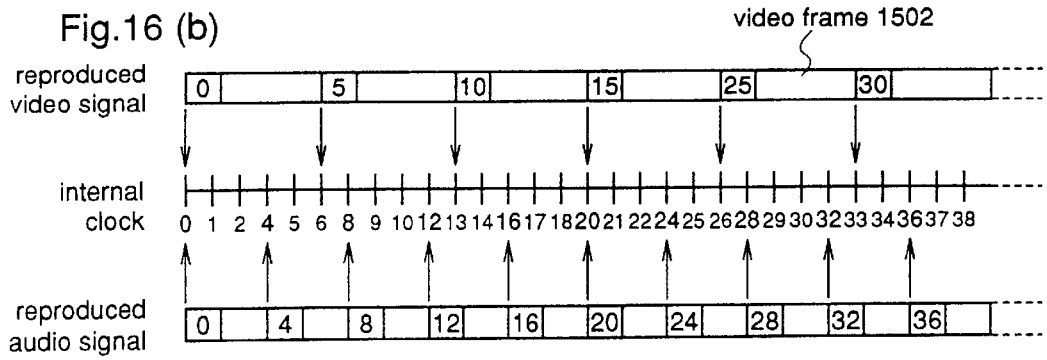
Figure 16:
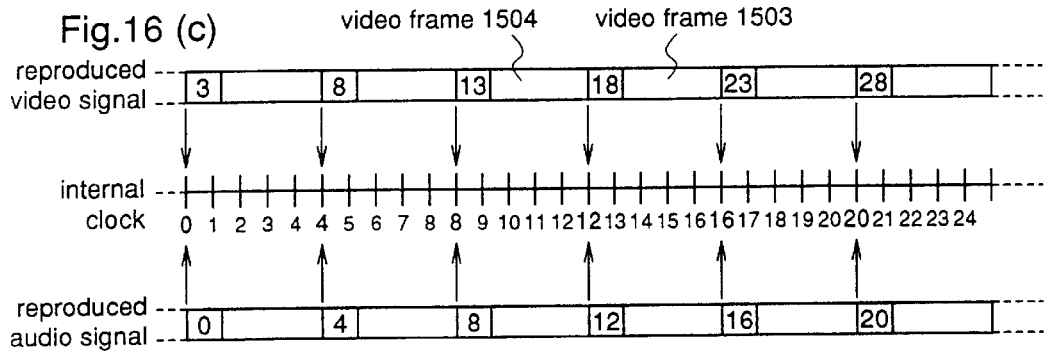
Figure 16:
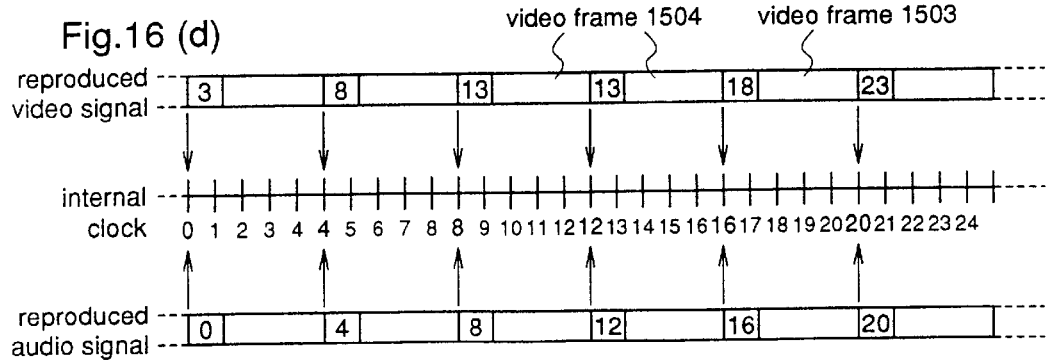
Figure 17:
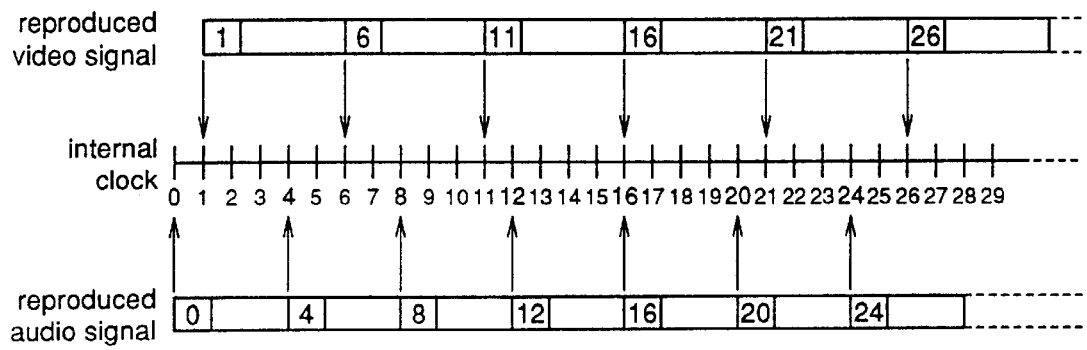
FIGS. 17(a) and 17(b) are diagrams for explaining the first problem to be solved by the present invention.
Figure 17:
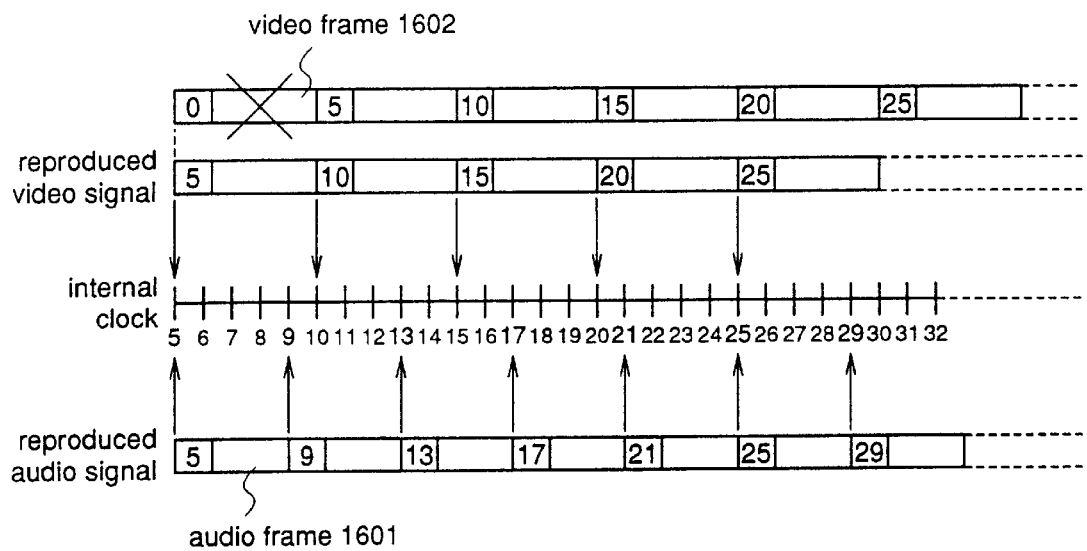
Figure 18:
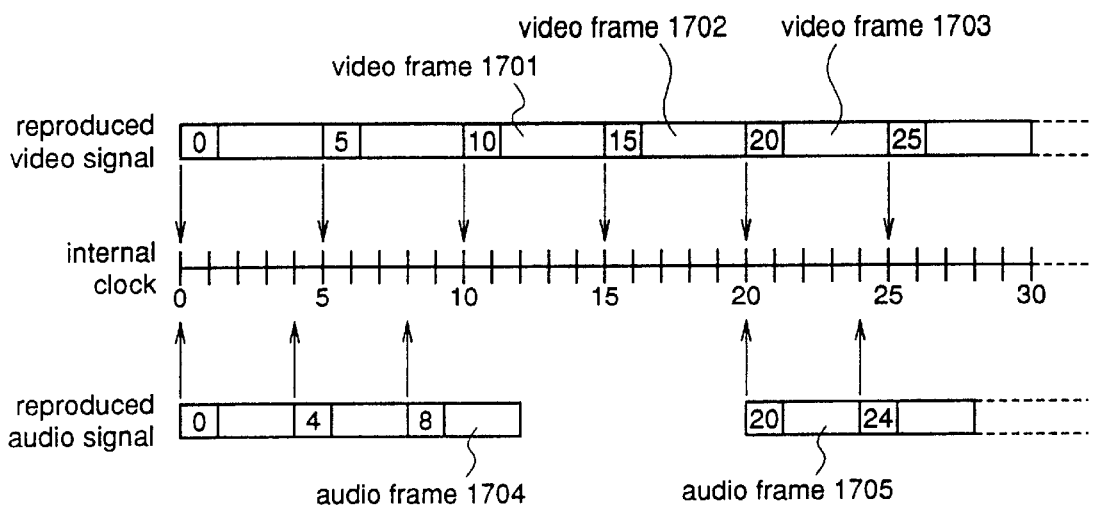
FIGS. 18(a) and 18(b) are diagrams for explaining the second problem to be solved by the present invention.
Figure 18:
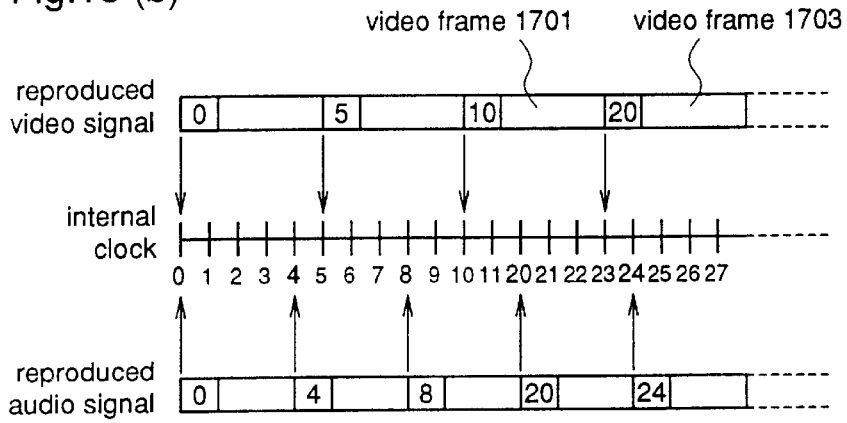
Figure 19:
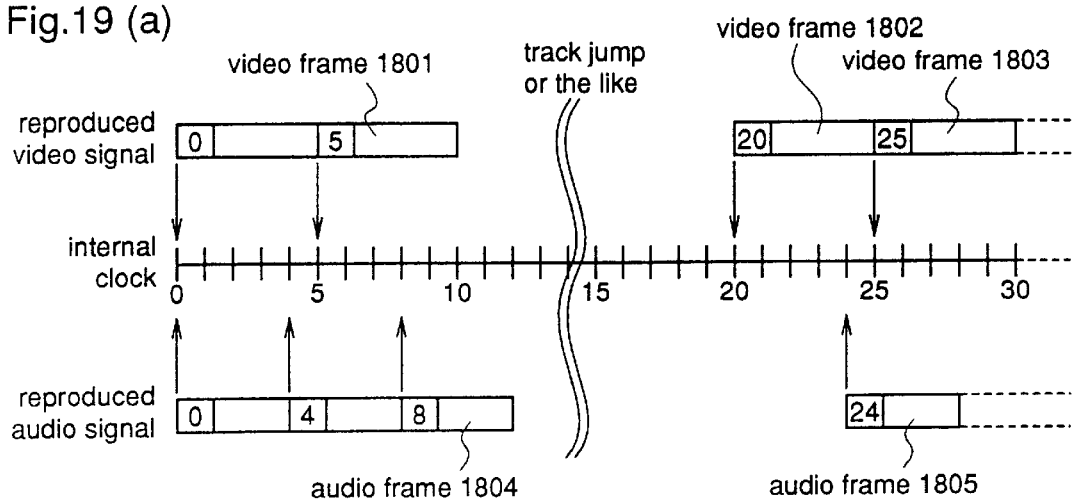
FIGS. 19(a)–19(c) are diagrams for explaining the third problem to be solved by the present invention.
Figure 19:
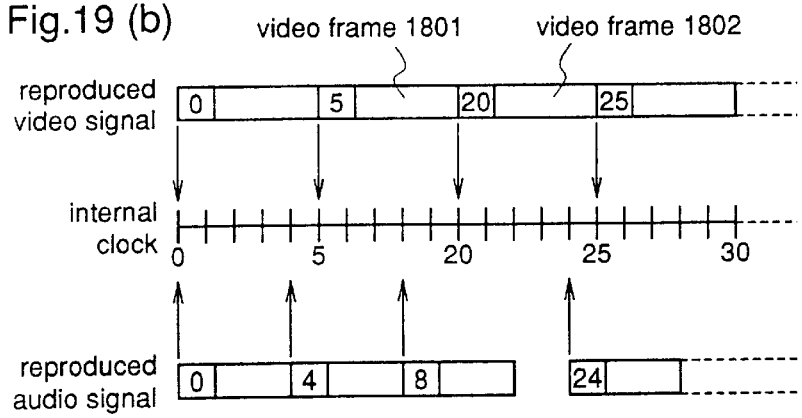
Figure 19:
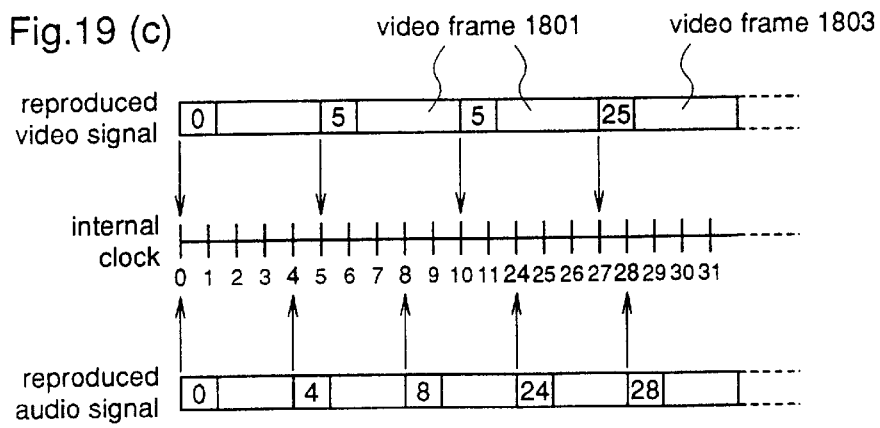

Initially, FIGS. 16(a) and 16(b) will be explained. In FIG. 16(a), the video presentation time error 118 of the video frame 1501 is −6, and this error is below the lower limit $TH_{min}$(VM) of the allowable error range as shown in FIGS. 5(b) and 6(b). Hence, presentation of the video frame 1501 is skipped and, as shown in FIG. 16(b), the next video frame 1502 is presented.

Next, FIGS. 16(c) and 16(d) will he explained. In FIG. 16(c), the video presentation time error 118 of the video frame 1503 is +6, and this error exceeds the upper limit $TH_{max}$(VM) of the allowable error range as shown in FIGS. 5(b) and 6(a). So, the video frame 1503 is kept waiting for presentation and, as shown in FIG. 16(d), the previous video frame 1504 is continuously presented. At time 16, the video presentation time error 118 of the video frame 1503 becomes +2. Since this error is within the allowable error range $TH_{min}$(VM)~$TH_{max}$(VM), the video frame 1503 is presented as it is.

Since the synchronous reproduction apparatus according to the first embodiment performs as mentioned above, even when synchronization error occurs between the reproduced video signal and the reproduced audio signal in the normal state, it is possible to restore synchronous reproduction of these signals.

In the example shown in FIGS. 16(a)–16(d), when the video presentation time error 118 is not within the allowable error range $TH_{min}$(VM)~$TH_{max}$(VM), the processing mode of the video control means 108 remains in the main process. However, it is not necessary for the processing mode of the video control means 108 to remain in the main process when the video presentation time error 118 is not within the allowable error range $TH_{min}$(VM)~$TH_{max}$(VM), and it may change to the start-up process 2 as shown in FIG. 3(b). Hereinafter, the case where the processing mode changes to the start-up process 2 will be described using FIGS. 20(a)–20(c).

Figure 20:
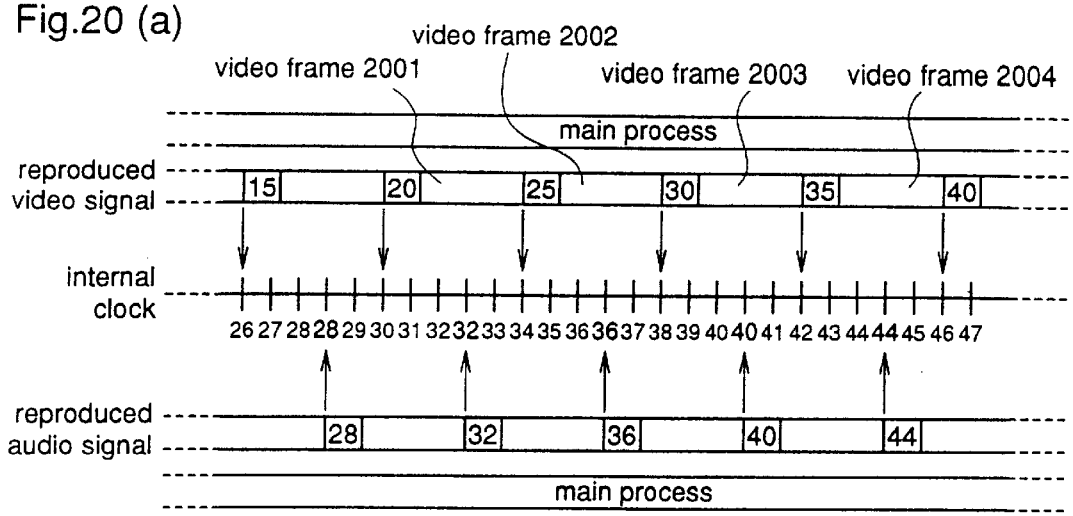
FIG. 20(a) is a diagram for explaining the case where synchronization error occurs in the reproduced video signal in the synchronous reproduction apparatus according to the first embodiment.
FIGS. 20(b) and 20(c) are diagrams for explaining the operation to remove the synchronization error by controlling the reproduced video signal.
Figure 20:
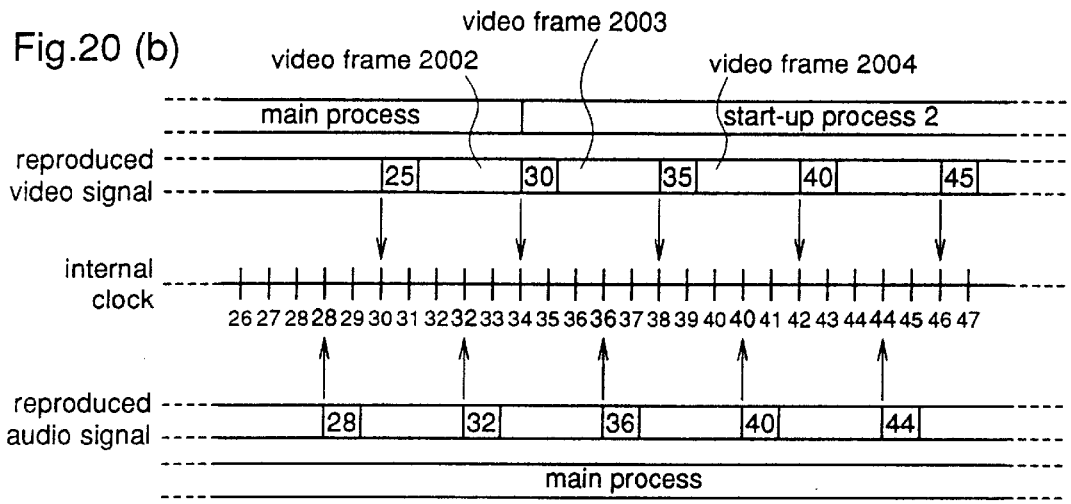
Figure 20:
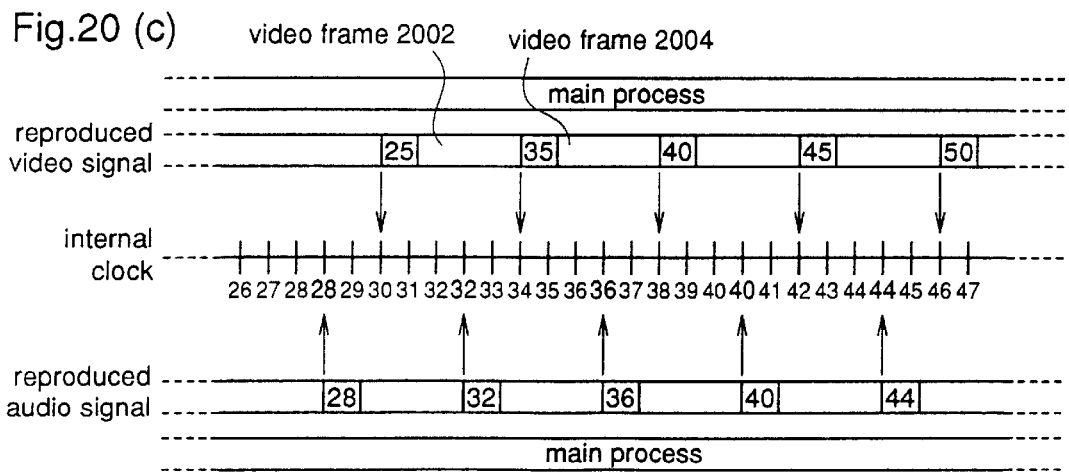

In FIGS. 20(a)–20(c), to set the allowable error ranges $TH_{min}$(VM)~$TH_{max}$(VM) and $TH_{min}$(VS)~$TH_{max}$(VS), the values shown in FIG. 6(b) are used, i.e., $TH_{min}$(VM)~$TH_{max}$(VM) is −9~+9 and $TH_{min}$(VS$_2$)~$TH_{max}$(VS$_2$) is −2.5~+2.5. That is, these allowable error ranges are set with some margins compared with the allowable error ranges $TH_{min}$(VM)~$TH_{max}$VM) (=−5~+5) and $TH_{min}$(VS)~$TH_{max}$(VS)(= 0~0) shown in FIG. 6(a).

At time 30, the video presentation time error 118 of the video frame 2001 is −10, and this error is below the lower limit $TH_{min}$(VM), −9, of the allowable error range. Hence, presentation of the video frame 2001 is skipped according to FIG. 5(d) and, as shown in FIG. 20(b), the next video frame 2002 is presented. The processing mode of the video control means 108 changes from the main process to the start-up process simultaneously with the presentation of the video frame 2002 (refer to FIG. 3(b)).

At time 34, the video presentation time error 118 of the video frame 2003 becomes −4, and this error is below the lower limit $TH_{min}$(VS$_2$), −2.5, of the allowable error range in the start-up process 2. Hence, as shown in FIG. 5(d), presentation of the video frame 2003 is skipped.

The video presentation time error 118 of the next video frame 2004 is +1, and this error is within the allowable error range $TH_{min}$(VS$_2$)~$TH_{max}$(VS$_2$). So, the video frame 2004 is presented, and the processing mode of the video control means 108 changes to the main process as shown in FIG. 3(b).

Here, a description is given of the reason why the processing mode of the video control means 108 is changed to the start-up process 2 when the video presentation time error 118 is not within the allowable error range $TH_{min}$ (VM) ~$TH_{max}$ (VM). When the video frame 2003 is intended to be presented, if the processing mode of the video control means 108 remains in the main process, since the video presentation time error 118 is −4 and this error is within the allowable error range $TH_{min}$ (VM)~$TH_{max}$ (VM), the video frame 2003 is presented. However, the fact that the video presentation time error 118 is −4 is not sufficient to assert that synchronous reproduction of the video signal and the audio signal is accurately recovered. So, the allowable error range $TH_{min}$(VS$_2$)~$TH_{max}$(VS$_2$) narrower than the allowable error range $TH_{min}$(VM)~$TH_{max}$(VM) used when the synchronization error is detected (i.e., when the video frame 2001 is intended to be presented) is used, whereby presentation of the video frame 2003 whose video presentation time error 118 is −4 is skipped, and the video frame 2004 whose video presentation time error 118 is +1 is presented. Thus, the accuracy of the synchronous reproduction of the video signal and the audio signal is improved.

As described above, in the synchronous reproduction apparatus according to the first embodiment, after recovering synchronous reproduction of the video signal and the audio signal, synchronization correcting operation in the starting state is temporarily performed, whereby highly accurate synchronous reproduction of the video signal and the audio signal is realized.

Figure 8:
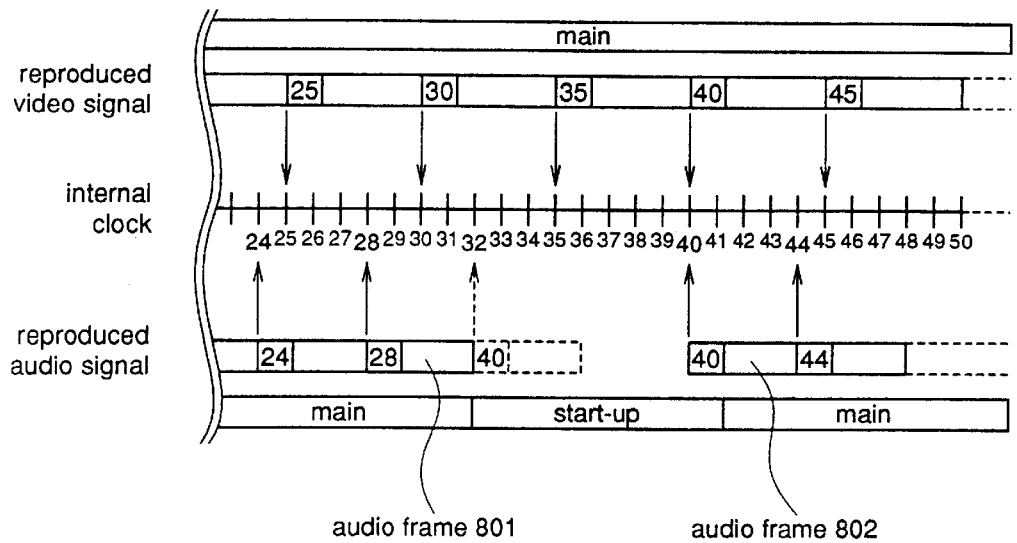
FIGS. 8(a) and 8(b) are diagrams for explaining the operation of the synchronous reproduction apparatus according to the first embodiment in the case where discontinuity occurs in the audio presentation time in the normal state (8(a)) and in the case where discontinuity occurs in the video presentation time in the normal state (8(b)).
Figure 8:
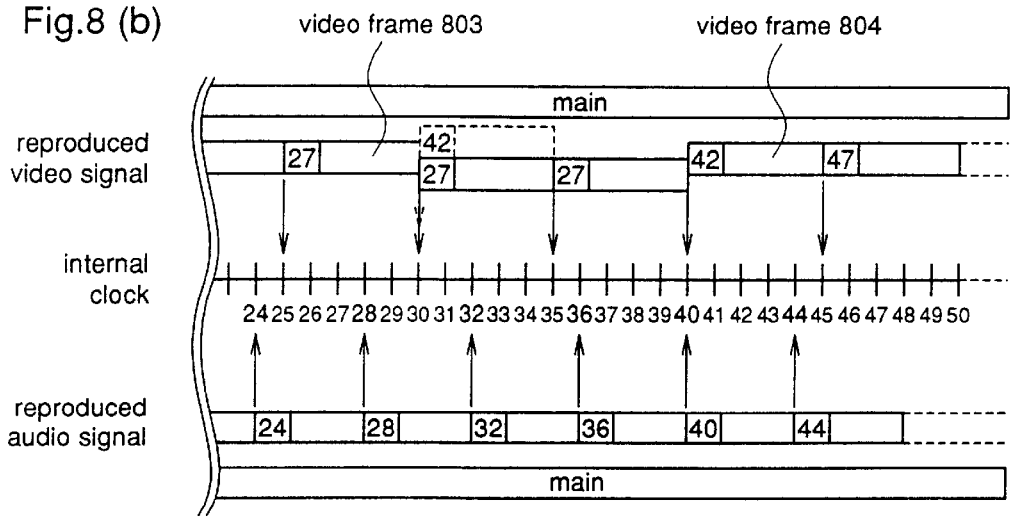

Next, a description is given of the operation of the synchronous reproduction apparatus in the case where time discontinuity occurs in the video presentation time or the audio presentation time, using FIGS. 8(a) and 8(b) FIG. 8(a) shows the operation of the synchronous reproduction apparatus in the case where temporal discontinuity exists in the audio presentation time 114 in the normal state. As shown in FIG. 8(a), time jump occurs between the successive audio frames 801 and 802. Until time 32, as shown in FIG. 3(b), both the video control means 108 and the audio control means 109 perform the main process, and both the reproduced video signal and the reproduced audio signal are being successively output in the normal state. In addition, the selecting means 105 selects the audio presentation time 114.

At time 32, though the reproduced audio signal of the next audio frame 802 is intended to be output, the audio presentation time error 120 of the audio frame 802 is +8 and this error exceeds the upper limit $TH_{max}$(AM) of the allowable error range. So, at time 32, the audio frame 802 is kept waiting for presentation and, as shown in FIG. 3(b), the audio control means 109 changes to the start-up process. In addition, the selecting means 105 does not update the internal clock 104.

At time 33, the audio presentation time error 120 of the audio frame 802 is +7 and, as shown in FIGS. 4(a) and 6(a), this error exceeds the upper limit $TH_{max}$(AS) of the allowable error range. Hence, also at time 33, the audio frame 802 is kept waiting for presentation. Likewise, at time 34 through time 39, the audio frame 802 is kept waiting for presentation.

At time 40, the audio presentation time error 120 of the audio frame 802 becomes 0, than is, within the allowable error range $TH_{min}$(AS)~$TH_{max}$(AS), so that output of the reproduced audio signal 117 of the audio frame 802 is started and, simultaneously, the processing mode of the audio control means 109 changes to the stain process as shown in FIG. 3(b).

Since the synchronous reproduction apparatus according to the first embodiment performs as mentioned above, in the normal state, even when temporal discontinuity exists in the audio presentation time, synchronous reproduction of the video signal and the audio signal is performed without skipping video frames.

FIG. 8(b) is a diagram for explaining the operation of the synchronous reproduction apparatus in the case where time discontinuity occurs in the video presentation time 114 in the normal state. As shown in FIG. 8(b), temporal discontinuity exists between the successive video frames 803 and 804. Until time 30, as shown in FIG. 3(b), both the video control means 108 and the audio control means 109 perform the main process, and both the reproduced video signal and the reproduced audio signal are being successively output in the normal state. In addition, the selecting means 105 selects the audio presentation time 114.

At time 30, though the reproduced video signal of the next video frame 804 is intended to be output, the video presentation time error 118 of the video frame 804 is +12, and this error exceeds the upper limit $TH_{max}(VM)$ of the allowable error range, as shown in FIGS. 5(b) and 6(a). So, the video frame 804 is kept waiting for presentation, and the previously presented video frame 803 is presented continuously. The same process as above is performed at time 35.

At time 40, the video presentation time error 120 of the video frame 804 becomes +2, that is, within the allowable error range $TH_{min}(VM) \sim TH_{max}(VM)$, so that output of the reproduced video signal 116 of the video frame 804 is started.

Since the synchronous reproduction apparatus according to the first embodiment performs as mentioned above, in the normal operation, even when temporal discontinuity exists in the video presentation time, synchronous reproduction of the video signal and the audio signal is performed while continuously presenting the video frames without incompatibility.

Figure 9:
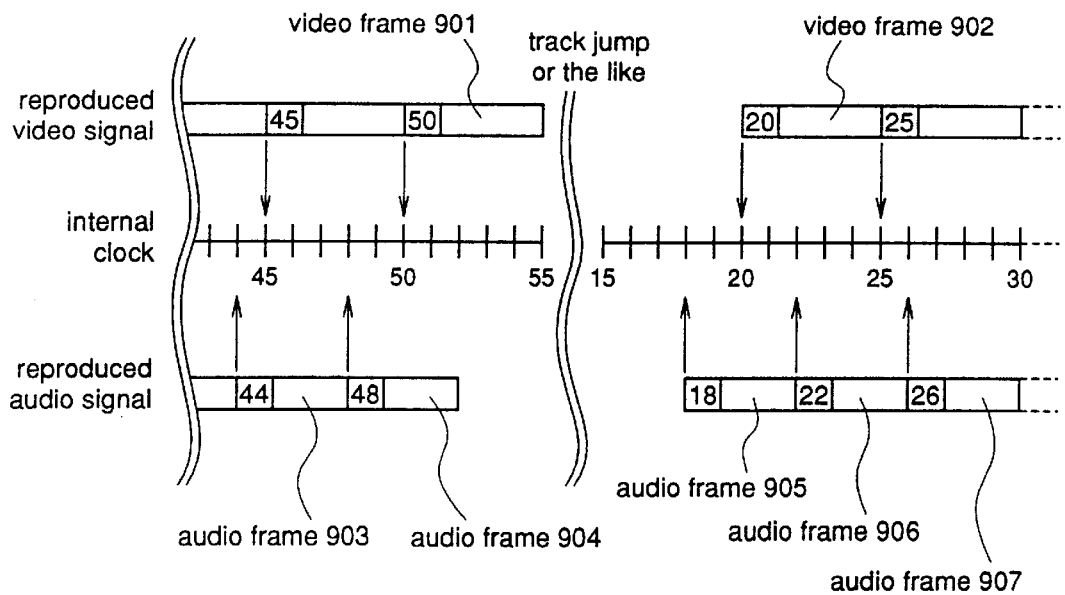
FIG. 9(a) is a diagram for explaining input data to the synchronous reproduction apparatus according to the first embodiment in the case where discontinuity occurs in the multiplexed bit stream in the normal state.
FIG. 9(b) is a diagram for explaining the first stage of the operation of the synchronous reproduction apparatus in the bit stream discontinuity generating state.
Figure 9:
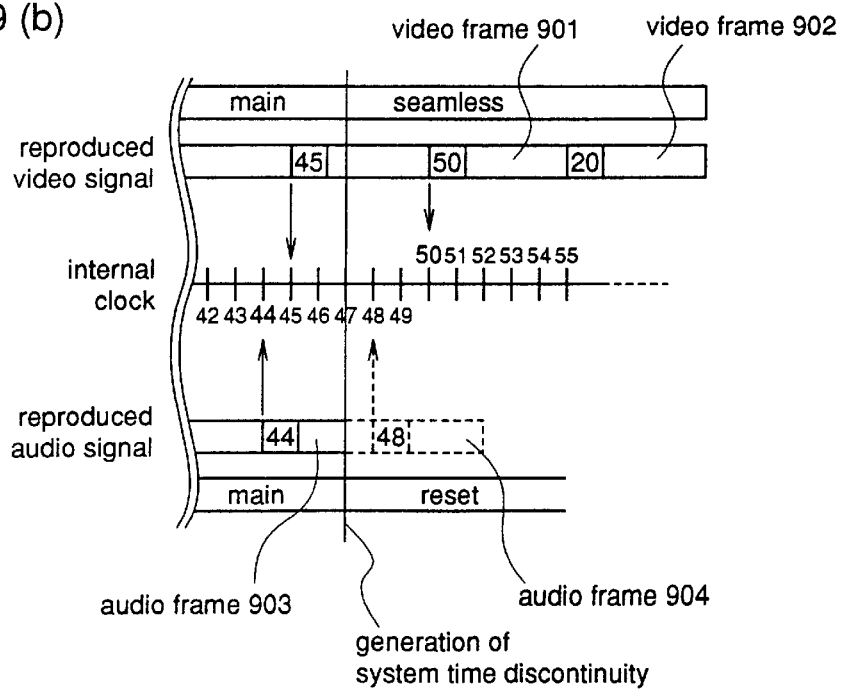

Next, a description is given of the operation of the synchronous reproduction apparatus in the case where discontinuity occurs in the multiplexed bit stream, using FIGS. 9(a) and 9(b). FIG. 9(a) is a diagram for explaining input data of the multiplexed bit stream to the synchronous reproduction apparatus in the bit stream discontinuity generating state. Due to track jumping or the like, data in its temporally discontinuous state is input to the synchronous reproduction apparatus.

The flow of the operation of the synchronous reproduction apparatus receiving this input is shown in FIGS. 9(b), 10(a) and 10(b).

With reference to FIG. 9(b), until time 47, both the video control means 108 and the audio control means 109 perform the main process, and both the reproduced video signal and the reproduced audio signal are being successively output in the normal state. The selecting means 105 selects the audio presentation time 114. At time 47, generation of a bit stream discontinuity is detected. At this time, according to FIG. 2, the system changes from the normal state to the bit stream discontinuity generating state, and the audio control means 109 performs the reset process as shown in FIG. 3(c), whereby decoding by the audio signal decoding means 103 is stopped. Then, output of the reproduced audio signal of the audio frame 903 is aborted, and the reproduced audio signal of the subsequent audio frame 904 is not output.

The processing mode of the video control means 108 changes to the seamless process, and the selecting means 105 selects the video presentation time 113. So, when the video frame 901 is presented, the internal clock 104 is updated at time 50 which is the video presentation time 113 possessed by the video frame 901.

Figure 10:
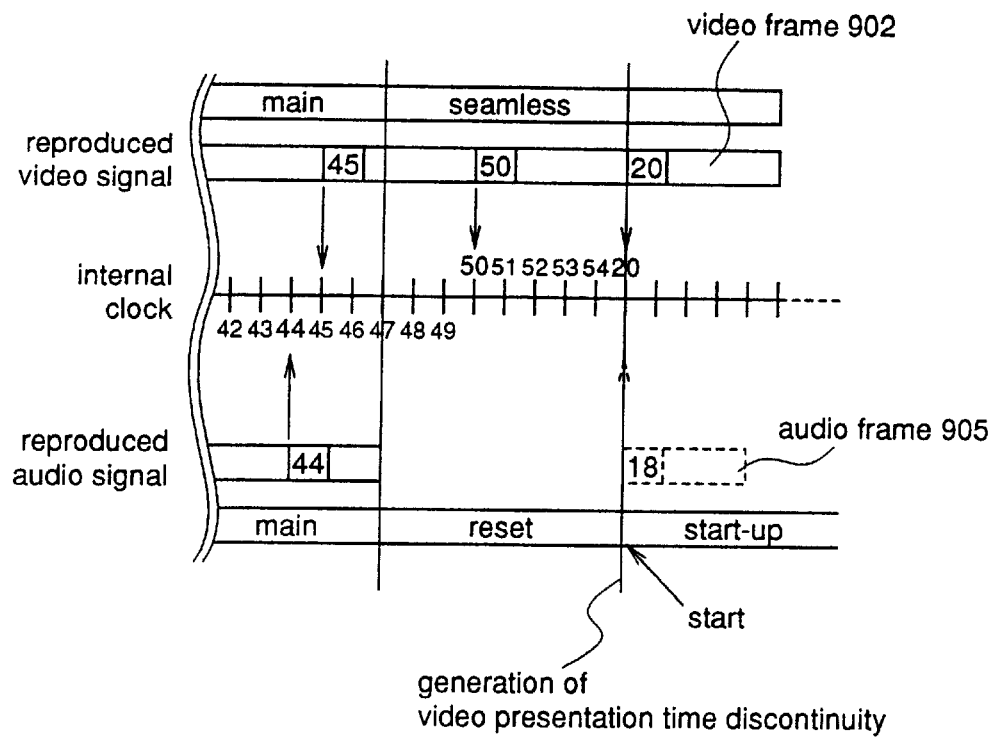
FIGS. 10(a) and 10(b) are diagrams for explaining the second and third states of the operation of the synchronous reproduction apparatus according to the first embodiment, respectively, when discontinuity occurs in the multiplexed bit stream in the normal state.
Figure 10:
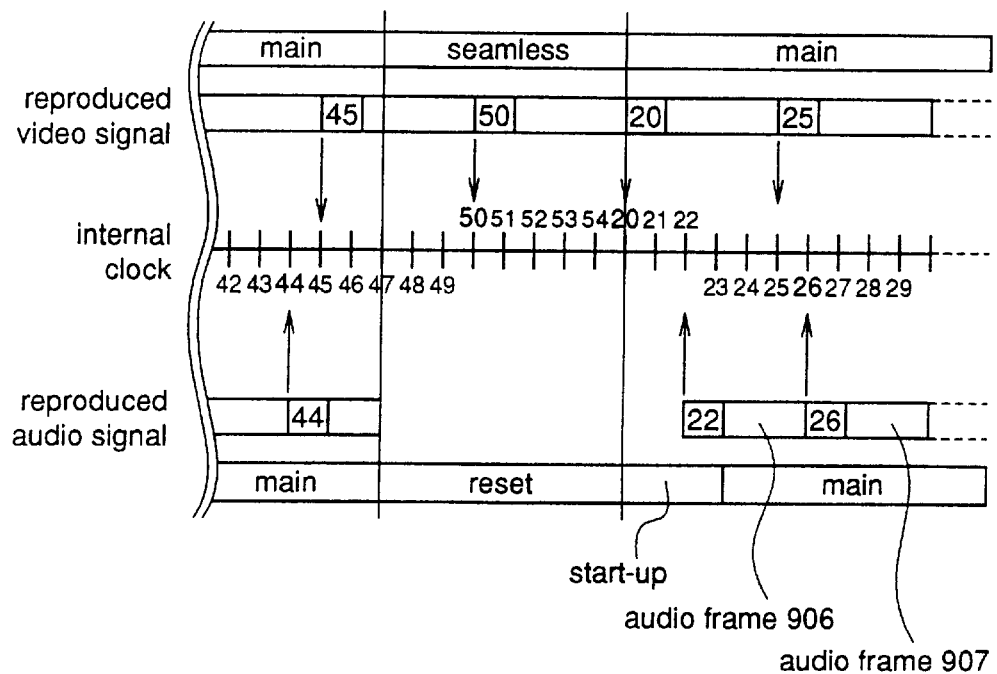

At time 55, the video presentation time error 118 of the video frame 902 becomes −35 and, as shown in FIGS. 5(c) and 6(a), this error is below the lower limit $TH_{min}(VL)$ of the allowable error range, so that the video control means 108 starts the audio signal decoding means 103. This state is shown in FIG. 10 (a). Further, during the seamless process, since the video control means 108 outputs a control signal 121 that gives an instruction to "present" the video frame regardless of the value of the video presentation time error, the video frame 902 is presented as it is, and the internal time 104 is updated using the video presentation time of the video frame 902.

When the audio signal decoding means 103 is started, the processing mode of the audio control means 109 changes to the start-up process. The audio presentation time error 120 of the audio frame 905 at time 20 is −2, and this error is below the lower limit $TH_{min}(AS)$ of the allowable error range, as shown in FIGS. 4(a) and 6(a). So, presentation of the audio frame 905 is skipped, and presentation of the audio frame 906 whose audio presentation time 114 is time 22 is attempted. However, the audio presentation time error 120 of the audio frame 906 at time 20 is +2, and this error is below the upper limit $TH_{max}(AS)$ of the allowable error range as shown in FIGS. 4(a) and 6(a). So, the audio frame 906 is kept waiting for presentation. The same process as above is carried out at time 21.

At time 22, as shown in FIG. 10(b), the audio presentation time error 120 of the audio frame 906 whose audio presentation time 114 is time 22 becomes 0. Since this error is within the allowable error range $TH_{min}(AS) \sim TH_{max}(AS)$, output of the reproduced audio signal of the audio frame 906 is started. At this time, output of both the reproduced video signal 116 and the reproduced audio signal 117 is started, and the system changes from the bit stream discontinuity generating state to the normal state as shown in FIG. 2. In the normal state, as shown in FIG. 3(b), both the video control means 108 and the audio control means 109 perform the main process, and the selecting means 105 selects the audio presentation time 114, so that the internal clock 104 is updated using the audio presentation time of each audio frame after the audio frame 907.

Since the synchronous reproduction apparatus according to the first embodiment operates as mentioned above, even when bit stream discontinuity occurs, synchronous reproduction of the video signal and the audio signal is carried out while continuously presenting the video frames without omission.

In the first embodiment of the invention, as shown in FIG. 6(a), the allowable ranges of the video presentation time error 118 and the audio presentation time error 121 are 0~0 when the video control means 108 and the audio control means 109 perform the start-up process. However, like the start-up process 2 shown in FIG. 6(b), some margins may be given to these ranges by employing values other than 0. Especially for the video signal, since the reproduced video signal must be output synchronously with a video vertical synchronous signal in the encoder, in NTSC, about 1/30 sec. is the minimum period in which comparison between the internal clock 104 and the presentation time of each video frame is possible. Therefore, there is little possibility that the video presentation time error 118 becomes 0, resulting in a risk that video presentation is not started. The most effective method to avoid the risk is to set the width of the allowable range to about 1/30 sec. that is the period of the video frame. When the allowable range is set to −1/15 sec.~+1/15 sec., output of the reproduced vide signal can be started with the highest accuracy.

In the first embodiment of the invention, as shown in FIGS. 6(a) and 6(b), the allowable error range of the video presentation time error 118 when the video control means 108 performs the main process is −5∼+5, and the allowable error range of the audio presentation time error 121 when the audio control means 109 performs the main process is −4∼+4. These ranges are decided using the presentation periods of the video frame and the audio frame, respectively, but the method of deciding the allowable error ranges is not restricted thereto. Any method may be employed as long as the following relationships are satisfied.

$$TH_{max}(AS) \leq TH_{max}(AM)$$

$$TH_{min}(AS) \geq TH_{min}(AM)$$

$$TH_{max}(VS) \leq TH_{max}(VM)$$

$$TH_{min}(VS) \geq TH_{min}(VM)$$

Further, in the first embodiment of the invention, as shown in FIGS. 6(a) and 6(b), the allowable error range of the video presentation time error 118 when the video control means 108 performs the seamless process is −15∼+15. Although this range is decided using a value three times as large as the presentation period of the video frame, the method of deciding the range is not restricted thereto. Any method may be employed as long as the following relationships are satisfied.

$$TH_{max}(VM) \leq TH_{max}(VL)$$

$$TH_{min}(VM) \geq TH_{min}(VL)$$

As described above, according to the first embodiment of the invention, during the starting operation of the synchronous reproduction apparatus, reproduction from the initial video frame is possible, whereby synchronous reproduction of the video signal and the audio signal can be started. During the normal operation, even when synchronization error occurs between the reproduced video signal and the reproduced audio signal, or when time discontinuity occurs in the video presentation time or the audio presentation time or in the multiplexed bit stream, synchronous reproduction of the video signal and the audio signal can be maintained while continuously presenting the video frames without incompatibility. Therefore, in any case, synchronous reproduction of the video signal and the audio signal in the best condition is possible.

[Embodiment 2]

Figure 11:
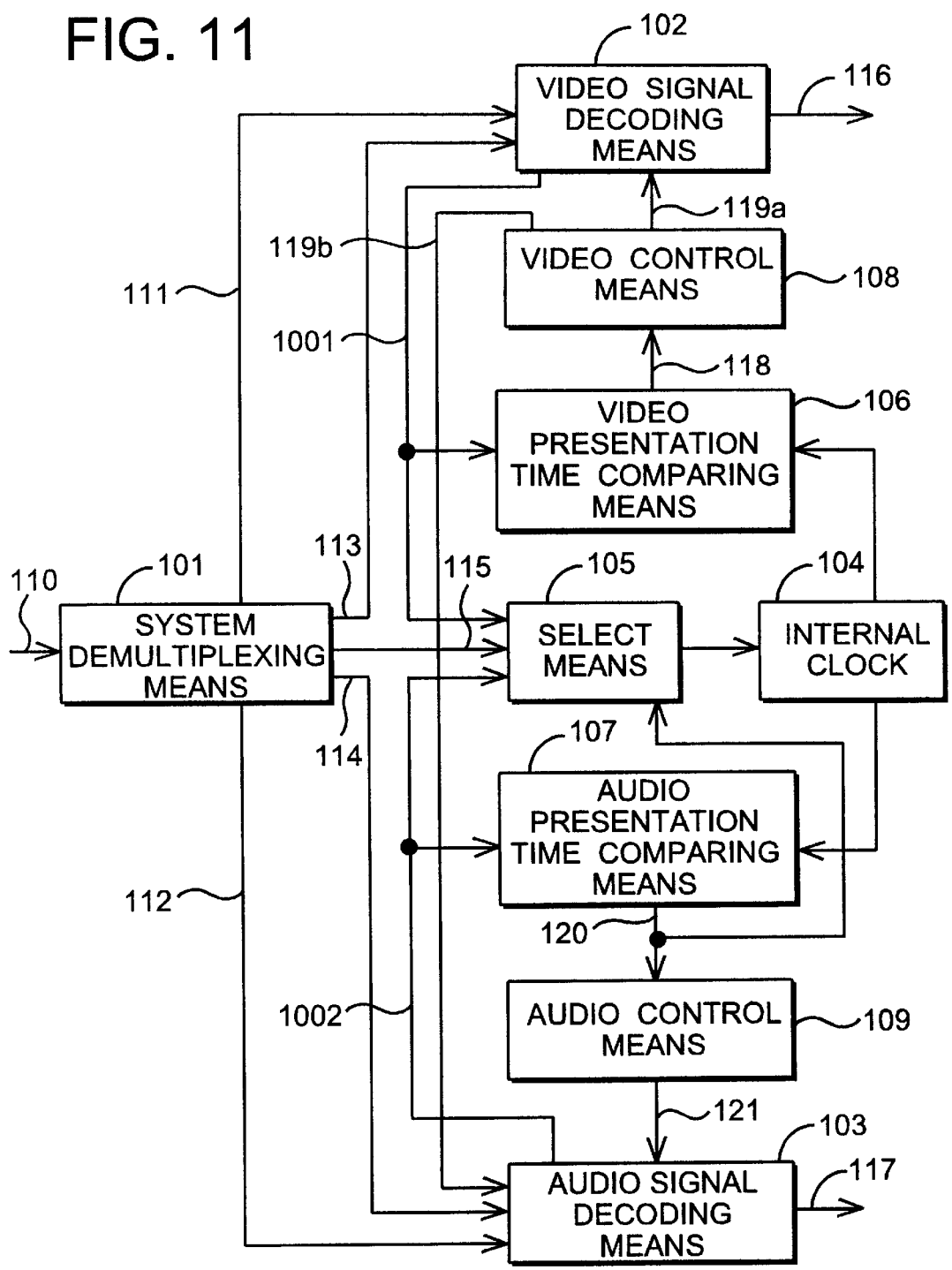
FIG. 11 is a block diagram illustrating a synchronous reproduction apparatus according to a second embodiment of the invention.

Next, a synchronous reproduction apparatus according to a second embodiment of the present invention will be described using FIG. 11. FIG. 11 is a block diagram illustrating the structure of the synchronous reproduction apparatus according to the second embodiment. In the synchronous reproduction apparatus according to the first embodiment, the video bit stream 111 and the audio bit stream 112, which are separated from the multiplexed bit stream 110 by the system demultiplexing means 101, are input to the video signal decoding means 102 and the audio signal decoding means 103, respectively. In this second embodiment, however, the video bit stream 111 and the video presentation time 113 are input to the video signal decoding means 102, and the video presentation time 113, which has passed through the video signal decoding means 102, is input to the video presentation time comparing means 106 and the selecting means 105. Further, the audio bit stream 112 and the audio presentation time 114 are input to the audio signal decoding means 102, and the audio presentation time 114, which has passed through the audio signal decoding means 102, is input to the audio presentation time comparing means 107 and the selecting means 105. The reason is as follows.

In the international standard of compressive coding of moving pictures, MPEG, it is not necessary to add presentation time stamps (PTS) to all of video and audio frames. So, there is a possibility that video frames and audio frames having no PTS exist. Therefore, when the video bit stream 111 and the audio bit stream 112 are processed separately from the video presentation time 113 and the audio presentation time 114, respectively, the correlation between each frame and its presentation time may be disordered. Further, especially in the video bit stream, a B picture which performs coding prediction from frames on both sides is present, and the coding order of the video frames is different from the decoding order thereof. Therefore, the correlation between each frame and its presentation time is further complicated.

If the presentation times of the video frame and the audio frame are compared with the time of the internal clock 104 by the video presentation time comparing means 106 and the audio presentation time comparing means 107, respectively, without correlating each frame with its presentation time, and each frame is decoded on the basis of the result of the comparison, synchronization error will occur between the reproduced video signal and the reproduced audio signal when these signals are output.

Therefore, in this second embodiment of the invention, after correlating the video bit stream 111 and the audio bit stream 112 with the video presentation time 113 and the audio presentation time 114, respectively, the video bit stream 111 and the video presentation time 113 are input to the video signal decoding means 102 while the audio bit stream 112 and the audio presentation time 114 are input to the audio signal decoding means 103.

According to the second embodiment of the present invention, since the synchronous reproduction apparatus is constructed as mentioned above, correlations between the video and audio frames and their presentation times can be maintained in their proper states, so that accurate synchronization between the video signal and the audio signal is realized.

[Embodiment 3]

Figure 12:
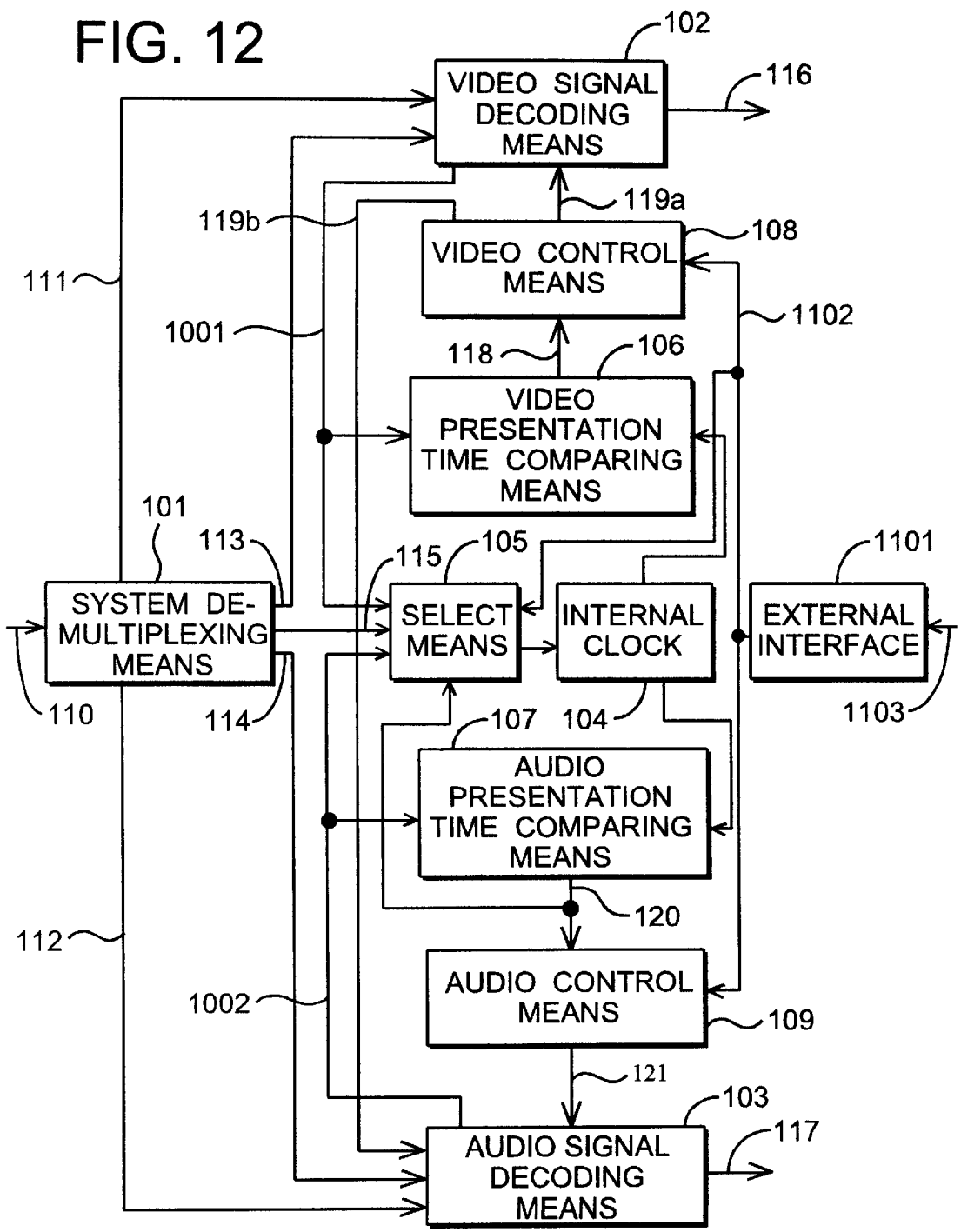
FIG. 12 is a block diagram illustrating a synchronous reproduction apparatus according to a third embodiment of the invention.

Next, a synchronous reproduction apparatus according to a third embodiment of the invention will be described using FIG. 12. FIG. 12 is a block diagram illustrating a synchronous reproduction apparatus according to this third embodiment. In the synchronous reproduction apparatus according to the second embodiment shown in FIG. 11, the request-to-start, the request-to-reset, and the discontinuity in the multiplexed bit stream are detected internally while controlling the selecting means 105, video control means 108, and audio control means 109. In this third embodiment, however, an external CPU (not shown) detects the request-to-start, the request-to-reset, and the discontinuity in the multiplexed bit stream, and information from the CPU (command 1103 from the outside) is decrypted by an external interface 1101, and the result is input as a control signal 1102 to the selecting means 105, the video control means 10B, and the audio control means 109.

Since the synchronous reproduction apparatus according to the third embodiment is constructed as mentioned above, flexible system control from the outside via the CPU is possible, providing a practical apparatus.

[Embodiment 4]

Figure 13:
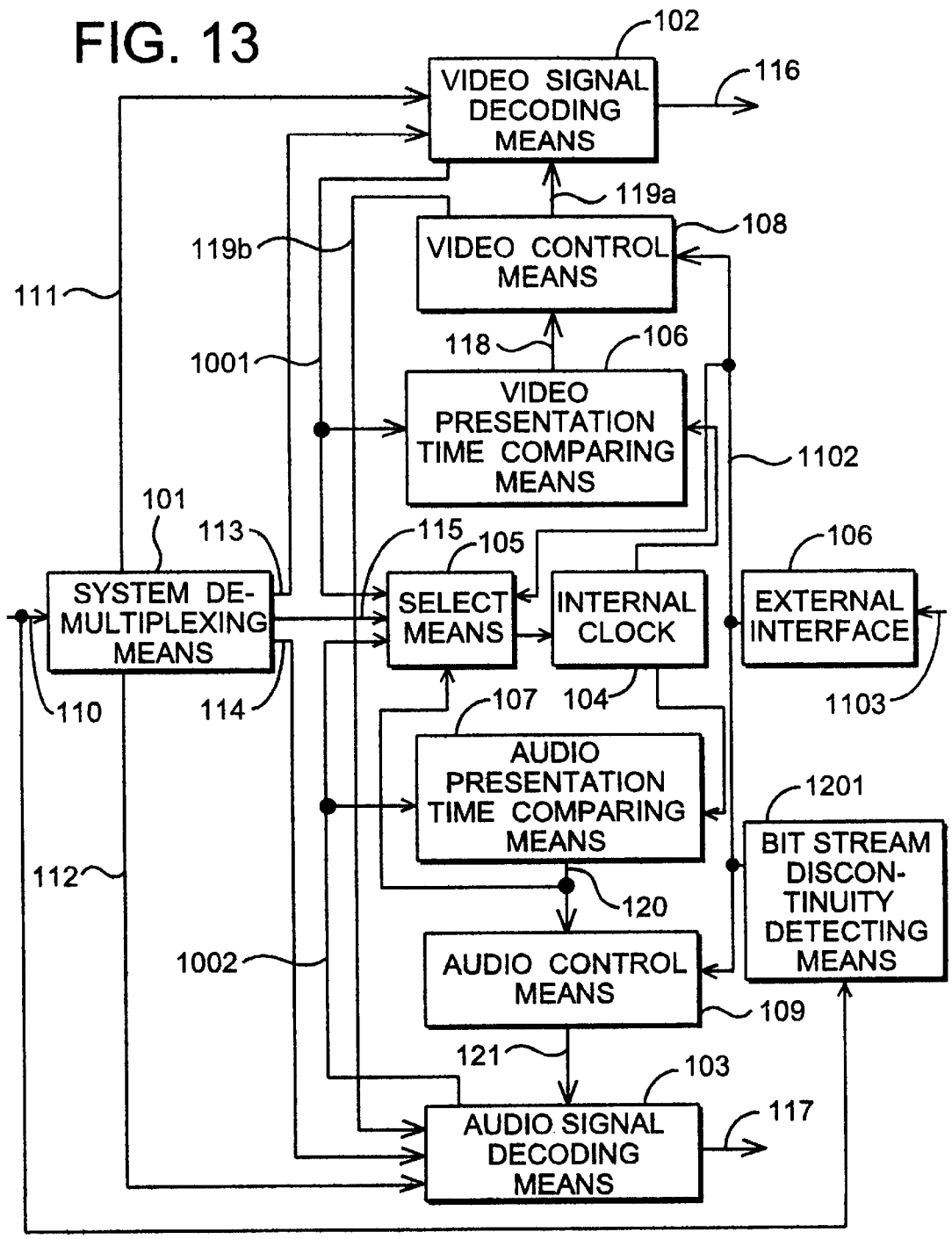
FIG. 13 is a block diagram illustrating a synchronous reproduction apparatus according to a fourth embodiment of the invention.
Figure 14:
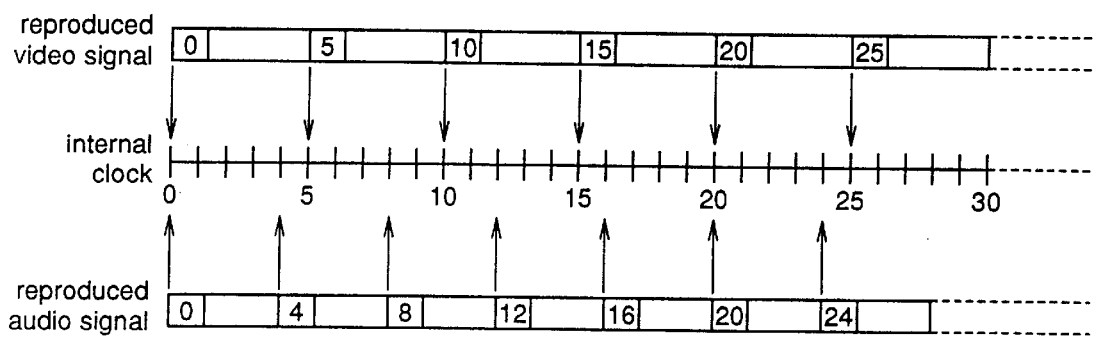
FIG. 14(a) is a diagram for explaining the conception of synchronous reproduction of a video signal and an audio signal.
FIG. 14(b) is a diagram for explaining the conception of generation of synchronization error between a video signal and an audio signal.
Figure 14:
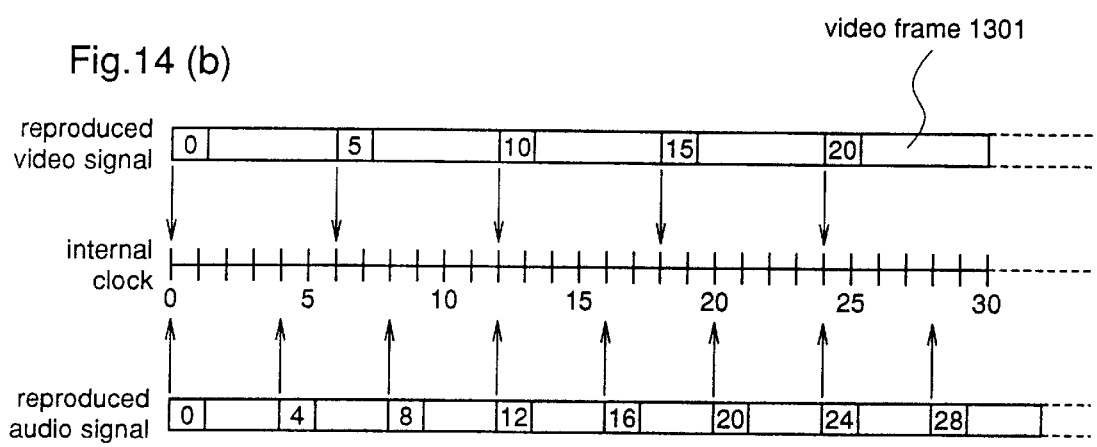
Figure 15:
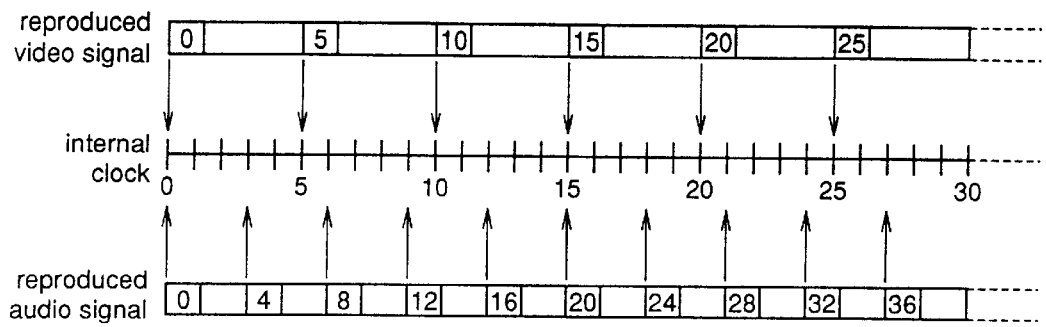
FIG. 15(a) is a diagram for explaining the operation of the conventional synchronous reproduction apparatus in the case where synchronization error occurs in the reproduced audio signal.
FIG. 15(b) is a diagram for explaining the operation to remove the synchronization error by controlling the reproduced audio signal.
FIG. 15(c) is a diagram for explaining the operation to remove the synchronization error using the audio master system.
Figure 15:
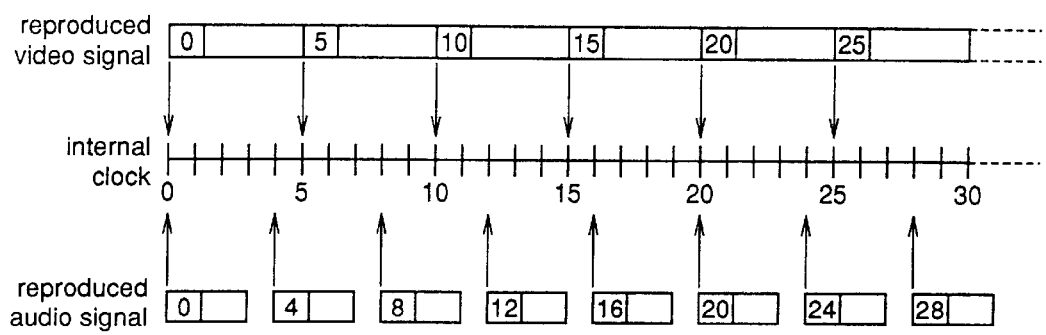
Figure 15:
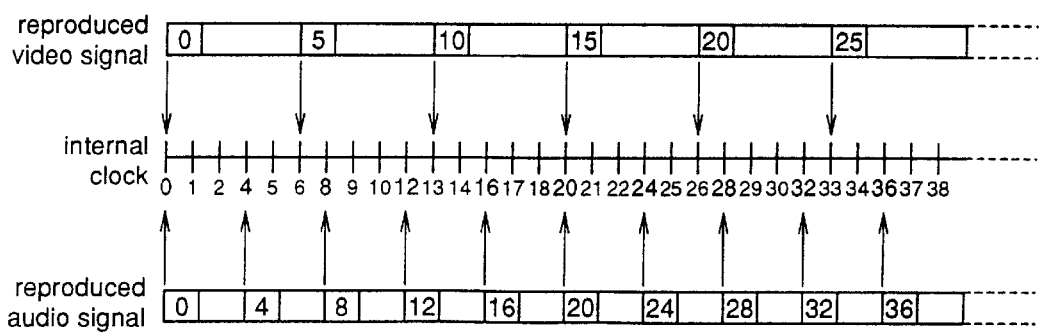

A synchronous reproduction apparatus according to a fourth embodiment of the invention will be described with reference to FIG. 13. FIG. 13 is a block diagram illustrating the structure of the synchronous reproduction apparatus according to the fourth embodiment. While in the synchronous reproduction apparatus according to the third embodiment the external CPU detects discontinuity in the multiplexed bit stream, in this fourth embodiment a bit stream discontinuity detecting means 1201 detects discontinuity in the multiplexed bit stream, and information from the detecting means is input to the selecting means 105, the video control means 108, and the audio control means 109.

Since the synchronous reproduction apparatus according to the fourth embodiment is constructed as mentioned above, adaptive system control is possible for an inherent bit stream discontinuity in the multiplexed bit stream which cannot be detected by the external CPU.

As described above, in the synchronous reproduction apparatus according to the present invention, even when synchronization error occurs between the reproduced video signal and the reproduced audio signal during the starting operation or the normal operation, the synchronous reproduction system can be adaptively switched from the audio master system to the other system. Therefore, in any case, decoding of video frames and audio frames is performed in the best condition, whereby synchronization of the reproduced video signal and the reproduced audio signal is maintained.

What is claimed is:

1. A synchronous reproduction apparatus for synchronously reproducing a video signal and an audio signal, and receiving a multiplexed bit stream in which the following data are packeted: video encoded data obtained by encoding video frames, each frame being a fundamental unit of reproduction of a video signal; video presentation time data showing a time to output a reproduced video signal of each video frame; audio encoded data obtained by encoding audio frames, each frame being a fundamental unit of reproduction of an audio signal; audio presentation time data showing a time to output a reproduced audio signal of each audio frame; and system time data:

said apparatus comprising:
   system demultiplexing means for demultiplexing the multiplexed bit stream into the video encoded data, the audio encoded data, the video presentation time data, the audio presentation time data, and the system time data;
   video signal decoding means for decoding the video encoded data to produce a reproduced video signal;
   audio signal decoding means for decoding the audio encoded data to produce a reproduced audio signal;
   selecting means for selecting the system time separated from the multiplexed bit stream by the system demultiplexing means, during the starting operation wherein output of the reproduced video signal and the reproduced audio signal is started, while selecting the audio presentation time separated from the multiplexed bit stream by the system demultiplexing means, during the normal operation after the starting operation, wherein the reproduced video signal and the reproduced audio signal are successively output;
   an internal clock for setting its time with reference to the system time output from the selecting means during the starting operation and setting its time with reference to the audio presentation time output from the selecting means during the normal operation, and generating successive reference times;
   video presentation time comparing means for providing a difference between the video presentation time and the time of the internal clock, and outputting the difference as a video presentation time error during the starting operation and the normal operation;
   audio presentation time comparing means for providing a difference between the audio presentation time and the time of the internal clock, and outputting the difference as an audio presentation time error during the starting operation and the normal operation;
   video control means for controlling, during the starting operation, the video signal decoding means so that output of the reproduced video signal is started when the video presentation time error is within a prescribed range $TH_{min}(VS) \sim TH_{max}(VS)$ and, during the normal operation, controlling the video signal decoding means by advancing or delaying output of the reproduced video signal so that the video presentation time error is within a prescribed range $TH_{min}(VM) \sim TH_{max}(VM)$; and
   audio control means for controlling, during the starting operation, the audio signal decoding means so that output of the reproduced audio signal is started when the audio presentation time error is within a prescribed range $TH_{min}(AS) \sim TH_{max}(AS)$ and, during the normal operation, controlling the audio signal decoding means by advancing or delaying output of the reproduced audio signal so that the video presentation time error is within a prescribed range $TH_{min}(AM) \sim TH_{max}(AM)$.

2. The synchronous reproduction apparatus of claim 1 wherein, during the starting operation, the video control means controls the video signal decoding means so that output of the reproduced video signal is started when the video presentation time error is within the range $TH_{min}(VS) \sim TH_{max}(VS)$ and, during the normal operation, the video control means monitors whether the video presentation time error is within the range $TH_{min}(VM) \sim TH_{max}(VM)$ or not and, when the error is not within the range, the video control means controls the video signal decoding means by advancing or delaying output of the reproduced video signal so that the error is within the range $TH_{min}(VS) \sim TH_{max}(VS)$; and during the starting operation, the audio control means controls the audio signal decoding means so that output of the reproduced audio signal is started when the audio presentation time error is within the range $TH_{min}(AS) \sim TH_{max}(AS)$ and, during the normal operation, the audio control means monitors whether the video presentation time error is within the range $TH_{min}(AM) \sim TH_{max}(AM)$ or not and, when the error is not within the range, the audio control means controls the audio signal decoding means by advancing or delaying output of the reproduced audio signal so that the error is within the range $TH_{min}(AS) \sim TH_{max}(AS)$.

3. The synchronous reproduction apparatus of claim 1 wherein:
   the selecting means selects the video presentation time separated from the multiplexed bit stream by the system demultiplexing means, when time discontinuity occurs in the multiplexed bit stream in the normal state, until recovering to the normal state;
   when discontinuity occurs in the multiplexed bit stream, the internal clock sets its time with reference to the video presentation time output from the selecting means, and generates successive reference times;
   when discontinuity occurs in the multiplexed bit stream, the video presentation time comparing means provides a difference between the video presentation time and the time of the internal clock, and outputs the difference as a video presentation time error;

when discontinuity occurs in the multiplexed bit stream, the audio presentation time comparing means provides a difference between the audio presentation time and the time of the internal clock, and outputs the difference as an audio presentation time error;

when discontinuity occurs in the multiplexed bit stream, the video control means controls the video signal decoding means so that the reproduced video signal is output without omission, regardless of the value of the video presentation time error and, when the video presentation time error exceeds a prescribed range $TH_{min}(VL) \sim TH_{max}(VL)$, the video control means starts the audio signal decoding means so that output of the reproduced audio signal is started and, at the start of the output of the reproduced audio signal, the video control means returns to the control mode in the normal operation; and when discontinuity occurs in the multiplexed bit stream, the audio control means resets the audio signal decoding means to stop output of the reproduced audio signal and, after the video control means starts the audio signal decoding means, the audio control means controls the audio decoding means so that output of the reproduced audio signal is started when the audio presentation time error is within the range $TH_{min}(AS) \sim TH_{max}(AS)$, and at the start of the output of the reproduced audio signal, the audio control means returns to the control mode in the normal operation.

4. The synchronous reproduction apparatus of claim 1 wherein:

the video signal decoding means decodes the video encoded data to provide the reproduced video signal, and outputs the video presentation time; and the audio signal decoding means decodes the audio encoded data to provide the reproduced audio signal, and outputs the video presentation time.

5. The synchronous reproduction apparatus of claim 1 further comprising an external interface for posting information of request-to-start, information of request-to-reset, and information of time discontinuity in the multiplexed bit stream, from the outside, to the selecting means, the video control means, and the audio control means.

6. The synchronous reproduction apparatus of claim 1 further comprising:

an external interface for posting information of request-to-start and information of request-to-reset, from the outside, to the selecting means, the video control means, and the audio control means; and bit stream discontinuity detecting means for detecting time discontinuity in the multiplexed bit stream and posting the information to the selecting means, the video control means, and the audio control means.

* * * * *